United States Patent
Huang

(10) Patent No.: US 7,171,442 B1
(45) Date of Patent: Jan. 30, 2007

(54) PRINTER MAINTENANCE SCHEME FOR A NETWORK CENTRIC PRINTING SYSTEM

(75) Inventor: Hung Huang, Tustin, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 595 days.

(21) Appl. No.: 09/664,550

(22) Filed: Sep. 18, 2000

(51) Int. Cl.
*G06F 15/16* (2006.01)

(52) U.S. Cl. ............... 709/203; 709/205; 709/220; 358/1.8

(58) Field of Classification Search ........ 709/223–225, 709/217, 218, 205, 203, 220; 370/908; 715/527; 358/1.8
See application file for complete search history.

(56) References Cited

U.S. PATENT DOCUMENTS

| | | | |
|---|---|---|---|
| 5,537,626 A * | 7/1996 | Kraslavsky et al. | 710/8 |
| 5,602,990 A * | 2/1997 | Leete | 714/46 |
| 5,737,739 A * | 4/1998 | Shirley et al. | 715/512 |
| 5,901,286 A * | 5/1999 | Danknick et al. | 709/203 |
| 5,960,177 A * | 9/1999 | Tanno | 709/229 |
| 6,003,078 A * | 12/1999 | Kodimer et al. | 709/224 |
| 6,041,183 A * | 3/2000 | Hayafune et al. | 717/173 |
| 6,253,238 B1 * | 6/2001 | Lauder et al. | 709/217 |
| 6,289,378 B1 * | 9/2001 | Meyer et al. | 709/223 |
| 6,490,052 B1 * | 12/2002 | Yanagidaira | 358/1.15 |
| 6,515,756 B1 * | 2/2003 | Mastie et al. | 358/1.15 |
| 6,532,491 B1 * | 3/2003 | Lakis et al. | 709/223 |

FOREIGN PATENT DOCUMENTS

| | | | |
|---|---|---|---|
| EP | 0 843 230 | | 6/1998 |
| EP | 0843230 | * | 6/1998 |
| GB | 2347766 | | 9/2000 |
| GB | 2347766 A | * | 9/2000 |

* cited by examiner

*Primary Examiner*—Saleh Najjah
*Assistant Examiner*—Dhairya A. Patel
(74) *Attorney, Agent, or Firm*—Fitzpatrick, Cella, Harper & Scinto

(57) ABSTRACT

Supporting printer maintenance in a network environment having a server, at least one network device and a printer, the server containing a plurality of printer configuration files, wherein the printer maintenance is supported by accessing one of the printer configuration files which corresponds to the printer, the configuration file including a plurality of printer maintenance function names and a plurality of printer maintenance commands corresponding to the printer maintenance function names, generating an HTML-based page corresponding to the printer, the HTML-based page containing each of the printer maintenance function names from the accessed printer configuration file, and sending the HTML-based page to the network device, wherein, upon selection in the network device of one of the printer maintenance function names in the HTML-based page, the server sends to the printer the printer maintenance command which corresponds to the selected printer maintenance function name.

24 Claims, 13 Drawing Sheets

PRINTER MAINTENANCE SCHEME FOR A NETWORK CENTRIC PRINTING SYSTEM

BACKGROUND OF THE INVENTION

1. Field of the Invention

The invention concerns a network centric printing system in which printer maintenance functions are accessed over the network from a printer configuration file. Specifically, the invention accesses a printer configuration file and then builds an HTML page which displays available maintenance functions from the printer configuration file for selection and use by a network user.

2. Incorporation By Reference

U.S. patent application Ser. No. 09/357,431, entitled "Software Architecture for Cable Television Home Printing", and U.S. patent application Ser. No. 09/357,433, entitled "Internet-Based Push Printing Over Cable Network", are each incorporated herein by reference.

3. Description of the Related Art

In a typical network-based system, the network is comprised of at least one server and several computing devices, such as personal computers and workstations, through which network users access and utilize the network servers. In such a system, the network user typically has a printer driver located locally within the personal computer or workstation that is used by the network user. In this manner, when the network user desires to print an image or information from an application, such as a network browser or a word-processing application, the related data is transformed through the printer driver in the network user's computer into print data for printing on the desired printer, regardless of whether the desired printer is located as a peripheral of the network user's computer or is a network printer.

Recently, the implementation of network centric environments has increased, in which a network server is accessed and utilized by a plurality of network users through a simple network device at the location of each network user. For example, a digital cable network provides not only digital cable television services to a home user having a set-top box (STB), but also provides other services to the network user through the STB, such as internet access. In such an environment, the STB is connected to the television of the network user and is also connected to a cable head end (CHE) of the digital cable network. The CHE is used to combine digital cable television services, internet access services and other third-party services for distribution from a server of the CHE to the STBs of the network users who subscribe to the digital cable network. In this manner, a home network user can access and utilize data image files from the server at the cable head end and also may access and utilize files from various locations on the internet via a browser in the STB.

It is desirable for a home user of a digital cable network to have the capability to print images to a printer located within the home of the home user and connected to the STB of the home user. Such printing systems are described in U.S. application Ser. No. 09/357,431, entitled "Software Architecture for Cable Television Home Printing", and U.S. patent application Ser. No. 09/357,433, entitled "Internet-Based Push Printing Over Cable Network". These applications describe a digital cable network which provides the ability of a server in the CHE to prepare and send print data from the CHE to the STB of the home user for printing on a printer which is connected to the STB. For example, the print data prepared at the CHE may represent a weekly subscription to specific information of interest to the home user wherein the CHE collects the information from a third party, such as a web site on the internet, and then prepares a print job containing print data by using a printer driver located in the CHE. The utilized printer driver corresponds to the type of printer located in the network user's home. In the alternative, the print data may represent information from a third party, such as an advertisement from a store, in which the print job is initiated by the third party, prepared by the CHE using the appropriate printer driver, and sent to the home network user's printer for printing.

It can be appreciated that frequent use of the network user's printer may result in degradation of the print quality of the printer if printer maintenance is not performed to return the printer to a good printing condition. Typical maintenance of a printer, such as an ink jet printer, includes cleaning of the print heads, the printing of a test page to test the print quality condition, the performance of a nozzle check to ensure that the nozzles are performing correctly, and a cleaning of the rollers. In a conventional network environment in which the network user accesses the network server via a personal computer, the network user can access the printer maintenance commands supported by the printer driver for the network user's printer through a graphic user interface supported by the printer driver. For example, the network user may use a pointing device, such as a mouse, to click on an icon corresponding to the printer, whereupon the printer driver supports the display of a printer maintenance window in which the network user can select one of several commands corresponding to each of the available printer maintenance functions.

In a network centric environment, such as a digital cable network, the network device utilized by the network user, such as a set-top box (STB), typically has limited hardware resources available to support execution of significant, complex software programs. For example, an STB has a limited amount of memory available that is less than the amount typically found in a personal computer. Accordingly, an STB is unable to load and execute a conventional printer driver having graphic user interface capabilities. This presents a problem in network centric environments that support printing services. For example, in a digital cable network system, an appropriate printer driver for each network user's printer on the network is located in the server of the CHE of the digital cable network. As discussed above, the printer driver is utilized by the CHE to generate a print job, either at the request of the network user or of a third party, and to send the print job down to the set-top box of the network user for printing on the printer connected to the set-top box. Accordingly, printers residing on the digital cable network need to be managed both by the network administrator at the cable head end and by each corresponding network user at the location of the printer.

Unfortunately, the printer drivers for all of the possible types of printers supported by the digital cable network tend to vary greatly in size, functionality and format. Therefore, the use of a common software program in the CHE server to provide a graphic user interface for all printer drivers to network users, including network administrators, would be very complex and cumbersome.

Therefore, a printing system is desired for network centric environments in which a common printer maintenance scheme is utilized for allowing both the network administrator and the printer owners to access printer maintenance functions for maintaining the printer of each network user in a good printing condition, wherein the scheme is general enough to support many different types of printers. It is also desirable that the common printer maintenance scheme should not have to be modified every time a new type of printer is added to the digital cable network. In addition, the scheme should be easy to use by a network user via a network device having limited resources, such as a set-top box.

SUMMARY OF THE INVENTION

The present invention addresses the foregoing problems by providing a printer maintenance scheme for use in a network centric environment, wherein a network user accesses a web page from a server that displays printer maintenance command names and descriptions for the desired printer, which are obtained from a printer configuration file corresponding to the desired printer. When the network user selects one of the printer maintenance functions from the web page, the corresponding maintenance command is sent from the server to the network user's set-top box and then to the printer attached to the set-top box in order to initiate the desired printer maintenance function in the printer. Accordingly, a generalized printer maintenance scheme is provided for supporting any type of printer connected to the network centric system, wherein the printer maintenance scheme can be accessed by either a network user or a network administrator, and wherein the printer maintenance function descriptions and commands are accessed directly from an extended printer configuration file located in the server of the network centric system.

Accordingly, one aspect of the invention concerns printer maintenance support in a network environment having a server, a network device and a printer, the server containing a plurality of printer configuration files. The printer maintenance is supported by accessing one of the printer configuration files which corresponds to the printer, the configuration file including a plurality of printer maintenance function names and a plurality of printer maintenance commands corresponding to the printer maintenance function names, generating an HTML-based page corresponding to the printer, the HTML-based page containing each of the printer maintenance function names from the accessed printer configuration file, and sending the HTML-based page to the network device. Upon selection in the network device of one of the printer maintenance function names in the HTML-based page, the server sends to the printer the printer maintenance command which corresponds to the selected printer maintenance function name.

Preferably, the invention is implemented in the server in the network environment, and the step of accessing one of the printer configuration files is performed in response to a request from a network device of a network user, and the HTML-based page is sent to the network device of the requesting network user. In addition, the printer configuration file preferably has a standardized data format. Furthermore, the HTML-based page preferably is generated by using an interface module in the server, which is preferably a common gateway interface (CGI) module. Preferably, the invention is practiced in a server of a digital cable network system. Accordingly, the network device is a set-top box and the HTML-based page is sent to the set-top box of a requesting network user and displayed on a television attached to the set-top box. Also preferably, the standardized data format is an extended version of an existing printer configuration file format standard.

By virtue of the foregoing, a generalized, common printer maintenance scheme provides a common graphic interface to a network user, such as a network administrator or a home network user, for accessing printer maintenance functions of a particular printer in the network centric environment. This common printer maintenance scheme is made possible by standardized extensions to printer configuration files which are provided by the manufacturer of each printer. Accordingly, a network user can access the printer maintenance functions of a printer via a network device of limited capabilities, such as an STB. In addition, the printer maintenance scheme does not need to be modified every time a new type of printer is incorporated into the network centric environment because the corresponding printer maintenance functions of the new printer are supported in the printer's corresponding configuration file.

According to another aspect, the invention concerns the support of printer maintenance in a network environment having a server, a plurality of network devices, and a printer connected to one of the plurality of network devices, the server containing a plurality of printer configuration files. The printer maintenance support includes receiving a printer maintenance request from one of the network devices, the printer maintenance request containing a reference to the printer, and accessing one of the printer configuration files which corresponds to the printer, the printer configuration files having a standardized data format and including a plurality of printer maintenance function data sets each of which includes a printer maintenance function name, a printer maintenance function description, a printer maintenance function resource and a printer maintenance function command parameter. The printer maintenance support further includes generating, by use of an interface module in the server, an HTML-based page corresponding to the printer, the HTML-based page containing for each printer maintenance function data set the corresponding printer maintenance function name, the printer maintenance function description, the printer maintenance function resource and the printer maintenance function command parameter, and sending the HTML-based page to the network device that sent the printer maintenance request. Upon selection by the network device of one of the printer maintenance function names in the HTML-based page, the server sends to the printer a printer maintenance function command which is derived from the printer maintenance function command parameter corresponding to the selected printer maintenance function name.

Preferably, the invention is practiced in a server of a digital cable network system. Accordingly, the network device is a set-top box and the HTML-based page is sent to the set-top box of a requesting network user and displayed on a television attached to the set-top box. Also preferably, the standardized data format is an extended version of an existing printer configuration file format standard.

By virtue of the foregoing, a generalized, common printer maintenance scheme provides a common graphic interface to a network user, such as a network administrator or a home network user, for accessing printer maintenance functions of a particular printer in the network centric environment. This common printer maintenance scheme is made possible by standardized extensions to printer configuration files which are provided by the manufacturer of each printer. Accordingly, a network user can access the printer maintenance functions of a printer via a network device of limited capabilities, such as an STB. In addition, the printer maintenance scheme does not need to be modified every time a new type of printer is incorporated into the network centric environment because the corresponding printer maintenance functions of the new printer are supported in the printer's corresponding configuration file.

This brief summary has been provided so that the nature of the invention may be understood quickly. A more complete understanding of the invention can be obtained by reference to the following detailed description of the preferred embodiment thereof in connection with the attached drawings.

DETAILED DESCRIPTION OF THE PREFERRED EMBODIMENTS

The present invention relates to a common printer maintenance scheme for access and utilization by users of a broadband network in order to support printer maintenance of printers in the broadband network. It should be noted that the present invention can be implemented in any general broadband network which supports network centric printing services. Examples of such broadband networks include, but are not limited to, digital cable networks, DSL networks, wireless digital networks, satellite-based networks and the like. A digital cable network is used herein for purposes of explaining the present invention, although it can be appreciated that the present invention may be practiced in any one of the foregoing broadband networks, as well as other types of broadband networks.

Figure 1:
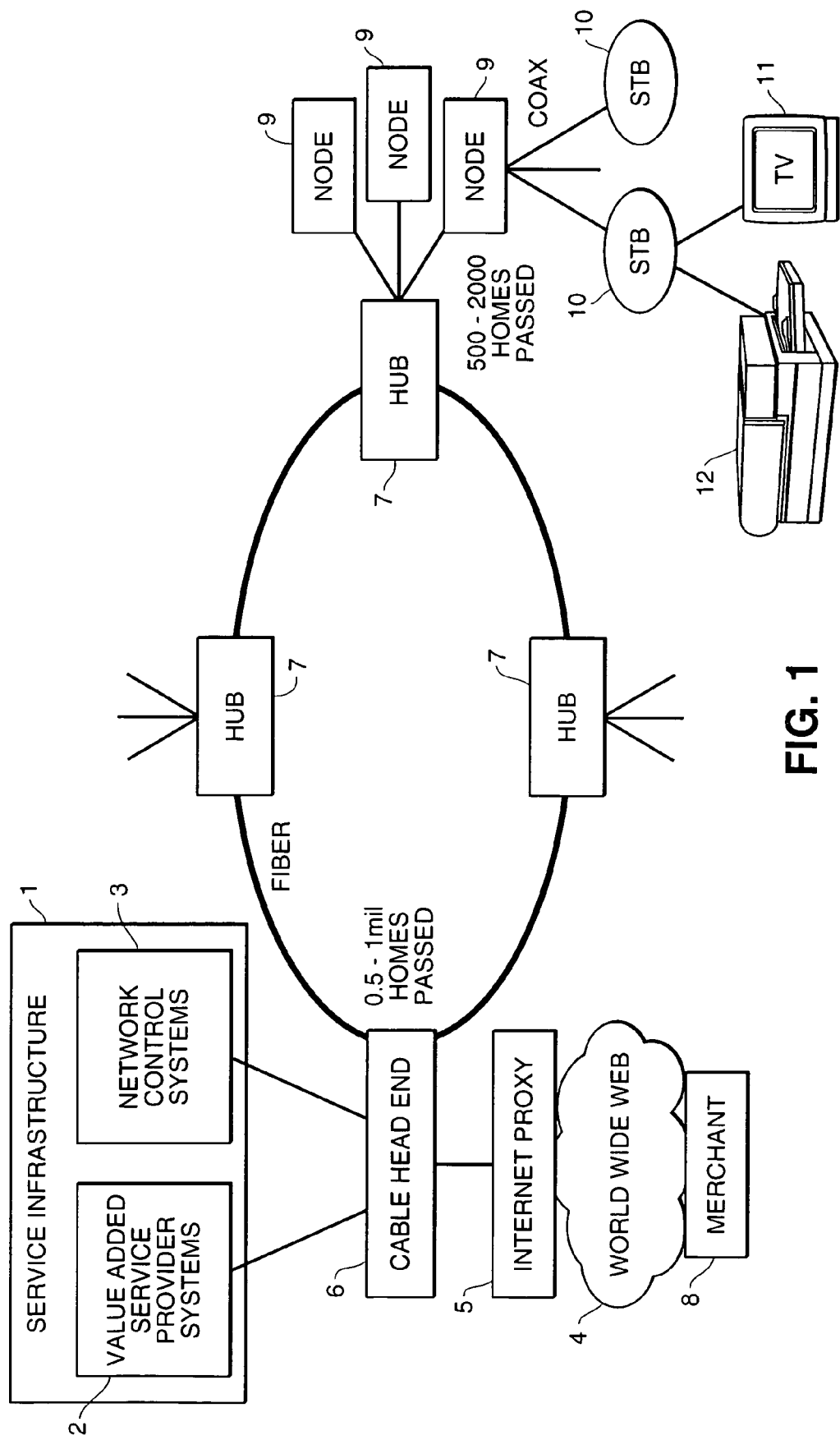
FIG. 1 is a representation of a cable broadband network in which the present invention may be practiced.

FIG. 1 illustrates a regional broadband digital cable network connected to the internet and utilizing the present invention. The network is capable of delivering analog and digital broadcasts, secure analog and digital broadcasts, analog and digital pay-per-view, analog and digital impulse pay-per-view, digital near video on demand, one-way real-time datagram (broadcast IP data packets), and two-way real-time datagram (addressed IP data packets).

As shown in FIG. 1, the above-listed services may be delivered from service infrastructure 1 located at the cable head-end, the infrastructure including value-added service provider systems 2 and network control systems 3. Value-added service provider systems 2 include digital satellite distribution systems, applications executing on cable servers (such as special-purpose applications like subscriber service application, content gather applications, etc.), digital media servers outputting MPEG-2 datastreams, and an application data carousel defined by the DSM-CC specification. Network control systems 2, consisting of the Broadcast Control Suite and the PowerKey Control Suite, provide management and control for the services supported by the broadband network.

Alternatively, services may be delivered from World Wide Web (WWW) 4 through internet proxy 5, for example, from remote merchants like merchant 8. Examples of merchants include banking, retailing, utilities, and the like.

In either case, the services are delivered to Cable Head End (CHE) 6, which serves as an interface between the service providers and the rest of the broadband network.

In particular, CHE 6, which is responsible for providing services to 500,000 to 1,000,000 homes, is connected via fiber optic cabling to hubs 7, which are connected to CHE 6 or other hubs 7. Each hub 7 is, in turn, connected to at least one node 9, also using fiber optic cabling. Coaxial cable is then used to connect each node to Set Top Boxes 10 (STB's) of 500 to 2000 homes. Finally, each STB 10 is connected to television 11, printer 12 or both. Accordingly, services are delivered from a service provider to CHE 6, to one or more hubs 7, to node 9, to STB 10 and to television 11 or printer 12. A user of STB 10 may utilize a remote control or other type of pointing device to interface with the services offered via STB 10 and displayed on television 11.

It should be noted that, by virtue of the foregoing arrangement, service infrastructure 1 may be distributed among CHE 6, hubs 7, or other facilities.

Figure 2:
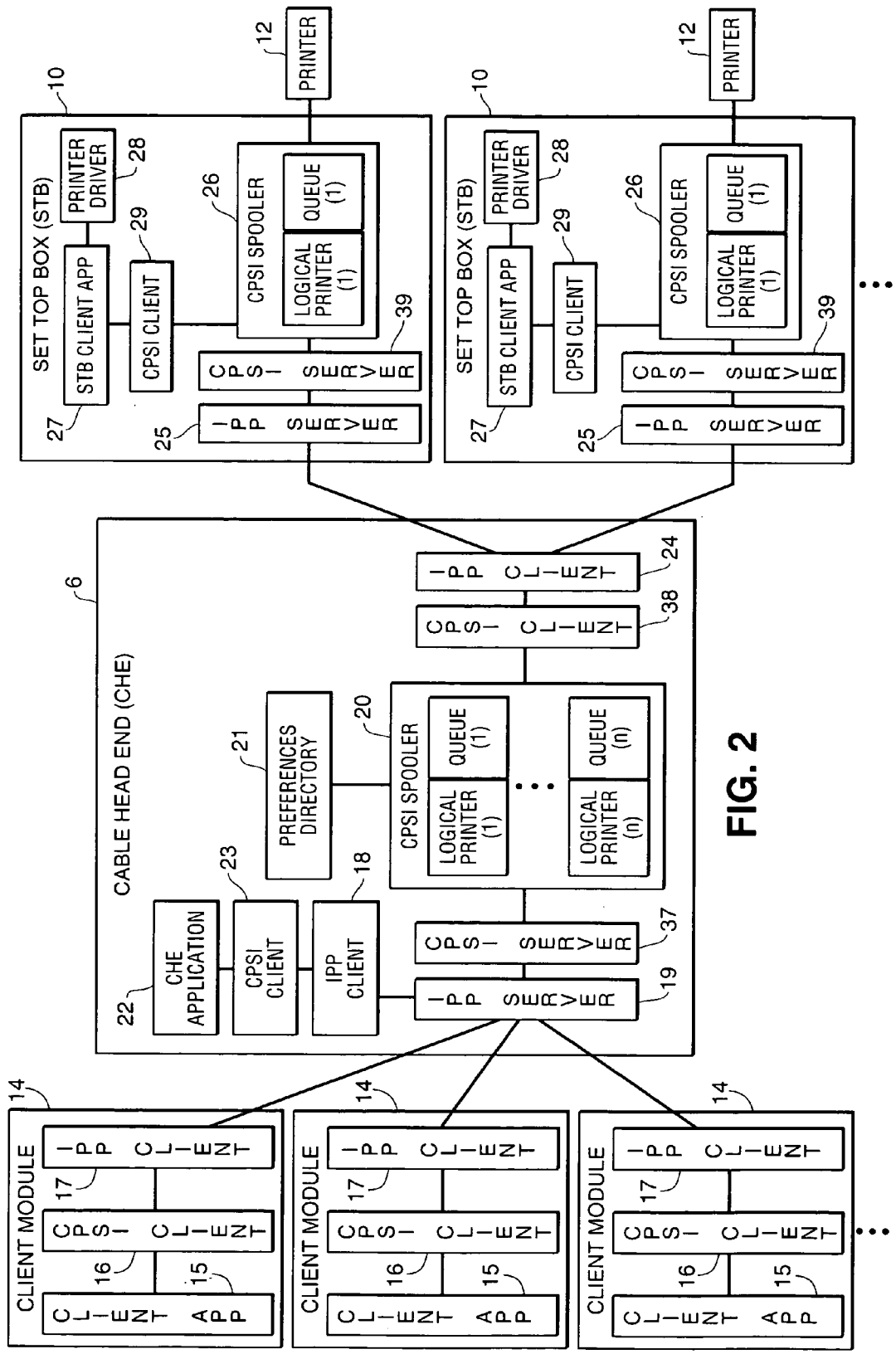
FIG. 2 is a representation of a printing architecture according in which the present invention may be practiced.

FIG. 2 illustrates several relevant components of service infrastructure 1, CHE 6, and STB 10, as well as relevant internet components of remote client modules connected to CHE 6 via internet proxy 5. In particular, three representative client modules 14 are illustrated (although many more are contemplated in an actual implementation), each client module 14 being located remotely of CHE 6 and connected to CHE 6 over the internet via internet proxy 5. Client modules 14 may be executing on servers operated by a bank, a newspaper, or other entity from which a user may desire print data. Of course, more than three client modules 14 may be connected to the architecture shown in FIG. 2.

Each client module 14 includes client application 15, a Cable Printing Services Infrastructure (CPSI) client 16, and Internet Printing Protocol (IPP) client 17. Each client application 15 is preferably specific to services being performed at the client module, such as banking services, newspaper services, and the like. Other client-specific applications may also be executed at the client modules, such as applications that generate data or access databases for printout. Client application 15 communicates with CPSI client 16 using an application programming interface (API).

CPSI client 16 delivers print data received from client application 15 to CHE 6 through IPP client 17. Correspondingly, CHE 6 is provided with IPP server 19 to receive the print data. It should be noted that the print data travels over all three of IPP, HTTP, and TCP/IP protocols between respective ones of IPP clients 17 and IPP server 19.

Although FIG. 2 is illustrated with an IPP client/server communication between client modules 14 and CHE 6, other communication protocols, or layers of protocols, may also be used. For example, to facilitate printing that is secure, an SSL (secure socket layer) protocol may be utilized. In such an arrangement, a protocol stack is used, consisting of IPP client 17 over HTTP over SSL over TCP/IP. A complementary arrangement is provided at CHE 6. Similarly, other protocols may be used, and multiple protocols can be used in parallel or in stacked arrangements.

Whatever client/server arrangement is used, the client and servers communicate over a CPSI transport layer that facilitates communication from CPSI client 16. In general, data is pushed in one direction from CPSI client, with little or no data (other than acknowledgments and the like) returning in the other direction toward CPSI client 16. The actual CPSI transport may use TCP/IP, SMTP, or the like. The sessions may be secure. The CPSI transport layer is configured to hide any differences in the actual transport from CPSI client 16, so that the actual transport is transparent from the viewpoint of CPSI client 16, thereby making CPSI client 16 transport-independent.

CHE 6 includes CPSI server 37, which is complementary in software structure to CPSI client 16, and acts to receive data transmitted from CPSI client 16. CHE 6 further includes spooler 20, which assigns print data received from IPP server 19 and CPSI server 37 to a logical printer corresponding logically to a printer 12, and queues print data for a physical device corresponding to the logical printer. CPSI spooler 20 assigns print data to a logical printer by retrieving a profile from preferences directory 21 which corresponds to a user ID or other address information received with the print data.

Besides address information, preference directory 21 also stores other information relating to subscriber preferences. Such information is set initially by the subscriber, during a registration process, and may thereafter be modified as desired. One such preference is a blocking feature, whereby a subscriber can block printing jobs that are received from particular merchants, or can accept print jobs only if they are received from particular merchants. Another such preference involves selection and configuration of an automatic data/information delivery service. According to this delivery service, and based on subscriber preferences, CHE 6 periodically executes a data gathering application (like application 22) that gathers information from internet sources (such as news, coupons, theater schedules and the like), packages the information into a print job, and sends the print job to the subscriber's set top box.

CPSI spooler 20 is also connected to cable-specific applications such as application 22 through CPSI server 37, IPP server 19, IPP client 18, and CPSI client 23. CPSI client 23 is similar to CPSI client 16. Moreover, application 22 is similar to client application 15, in that it provides an application executed to perform services specific to a client (here, the cable head end) and can deliver print data to CPSI spooler 20.

IPP client 24 is connected to CPSI spooler 20 via CPSI client 38 to allow CHE 6 to communicate with each STB 10. CPSI client 38 is similar to CPSI clients 16 and 23, and again provides for a complementary software architecture and data communications with a CPSI server at the set top box. In this regard, only two of many thousands of STB's are illustrated. Each STB 10 includes IPP server 25 for connection to IPP client 24. It should be noted that, to deliver data from CHE 6 to STB 10, a server is established in STB 10 and a corresponding client is established in CHE 6. In such a case, a preferred transport protocol is again the CPSI transport layer, which is usable regardless of the particular underlying transport (TCP/IP, SMTP, QPSK, DOCSYS, broadband through IP gateway, etc.).

Although FIG. 2 illustrates an IPP client/server communication between CHE 6 and STB 10, other protocols may also be used. For example, in a situation where the resources available in STB 10 are already strained, it is possible to use SMTP and POP mail protocols to deliver print jobs from CHE 6 to STB 10. Advantages of such an arrangement include the fact that many conventional STB's already include mail protocols, thereby avoiding a further increase in STB resource usage, firewalls that might exist in CHE 6 will allow mail to go through, multiple mailboxes can be defined in each household, and mail clients (at the client modules) can easily be configured to support print jobs. In the latter situation, CHE 6 and corresponding client modules 14 are also configured for communication via a mail protocol client/server relation, such as an SMTP client/server. Similarly, other protocols can be used between CHE 6 and respective STB 10's, and multiple protocols can be used in parallel or in stacked arrangements.

STB 10 includes CPSI server 39, and further includes CPSI spooler 26, which controls a single queue for a single logical printer corresponding to printer 12. Otherwise, CPSI spooler 26 is nearly identical to CPSI spooler 20, as are CPSI server 39 and CPSI server 37. The limited functionalities of CPSI spooler 26 and CPSI server 39 are advantageous because STB 10 is likely to have limited computing resources. STB 10 also includes STB client application 27, which communicates to CPSI spooler 26 through CPSI client 29, using a subset of the API used by client application 15. This configuration allows an STB user to initiate local print jobs.

Figure 3:
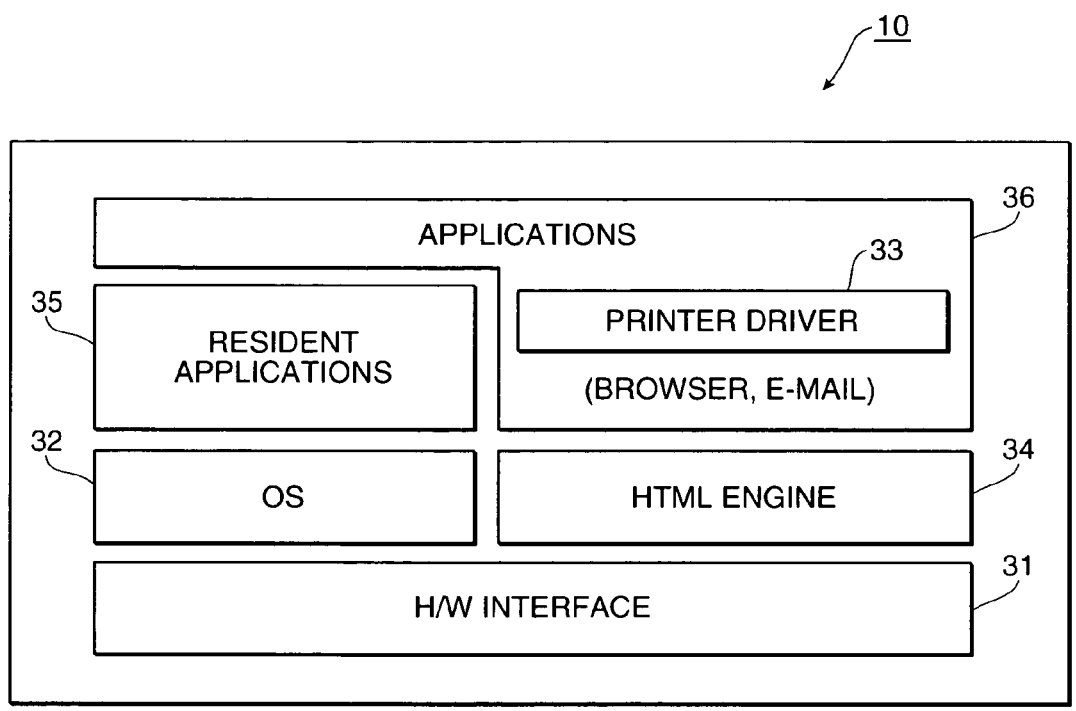
FIG. 3 illustrates representative software architecture of a set top box according to one embodiment of the present invention.

FIG. 3 illustrates representative software architecture of set top box 10. In general, this software architecture, together with the hardware architecture of the set top box, supports the reception of analog and digital services. In the case of analog services, STB 10 tunes to an analog channel, extracts the NTSC video signal, and drives the local television receiver. In the case of digital services, STB 10 tunes to the appropriate digital channel, extracts MPEG-2 video packets, decrypts, decompresses and routes the resulting video to an NTSC driver, so as to obtain an NTSC signal to drive the local television receiver. In addition, private data is received over the digital channel. Print jobs can be delivered to STB 10 over a digital channel of digital services, or over private data channel, and is delivered using the CPSI transport. STB 10 reconstructs the packets from the CPSI transport, and routes the data to the addressee, here, IPP server 25.

Through the software architecture illustrated in FIG. 3, STB 10 hosts various applications that present to the home user functionality offered by various cable services. Typical applications are a navigator, an interactive program guide, electronic mail and a web browser. Most of these applications are client/server implementations, where STB 10 hosts the client software, and CHE 6 hosts the server software. Communication between client and server over the cable network is facilitated by an operating system executed on STB 10, and is performed through published API's. Depending on the hardware platform and the operating system, those applications may be resident at STB 10, or can be downloaded from servers situated at CHE 6 for execution at STB 10.

Thus, as shown in FIG. 3, software architecture and STB 10 includes an interface 31 to hardware, an operating system 32, an HTML engine 34, resident applications 35, and other applications 36. The operating system 32 is usually vendor-specific for the STB, and may include operating systems such as PTV, WinCE, MicroWare or OpenTV. HTML engine 34 provides a group of independent handlers that can be plugged together in conformity to known plug-in specifications so as to provide ability to handle different types of media such as HTML, GIF, MPEG, HTTP, Java script, etc. The HTML engine 34 is used to allow STB 10 to render HTML documents to a windows manager for display on the local television receiver. HTML documents may be retrieved from local cache, from in-band and out-of-band broadcast carrousels, VBI streams, HTTP proxy servers located at CHE 6, or remote HTTP servers accessed by the STB user over the internet. In the latter case, documents retrieved from external web servers are filtered by a proxy according to predefined filtering criteria (such as surf watch), which also may convert requested documents into formats supported by the HTML engine 34.

Resident applications 35 include such applications as the aforementioned navigator, interactive program guide, and the like. Applications 35 and 36 include a web browser, an e-mail program, and print driver 33 for attached printer 12, as well as other applications. As described above, STB 10 has limited hardware resources compared to a typical personal computer or network workstation. Accordingly, the above-mentioned applications are limited in nature. Of particular importance, printer driver 33 is a stripped-down version of a conventional printer driver and therefore has limited capabilities. Printer driver 33 is used primarily to send print data and commands to printer 12. Accordingly, printer driver 33 has a limited ability, if any, to support a graphic user interface to allow a user of STB 10 to interact with printer driver 33. For example, unlike a user of a typical personal computer, a user of STB 10 is generally unable to access a graphic user interface supported by printer driver 33 in order to perform maintenance commands to maintain printer 12 in a good printing condition. Printer driver 33 may be provided to STB 10 by an external medium, such as a floppy disk or a CD-ROM, or through the browser application from applications 36. In the alternative, printer driver 33 may be provided to STB 10 from CHE 6 via a plug-and-play mechanism, as described in more detail below. Applications 35 and 36 also include the aforementioned applications from FIG. 2, namely IPP server 25, CPSI spooler 26, CPSI client 29, and STB client applications 27.

Because of limited resources available within STB 10, print data destined for printer 12 is not forwarded to STB 10 in a high level device-independent print language (such as a page description language like PCL5, PDF, PostScript or the like) for rasterization at STB 10. Such an arrangement, which requires STB 10 to rasterize print data based on a higher level printer language would often overwhelm the availability of resources at STB 10. Accordingly, and because a high speed data communication link exists between CHE 6 and STB 10, rasterization is performed at CHE 6, and rasterized data is sent from CHE 6 to STB 10 for printout by printer 12. This section describes a preferred implementation for achieving this effect.

Figure 4:
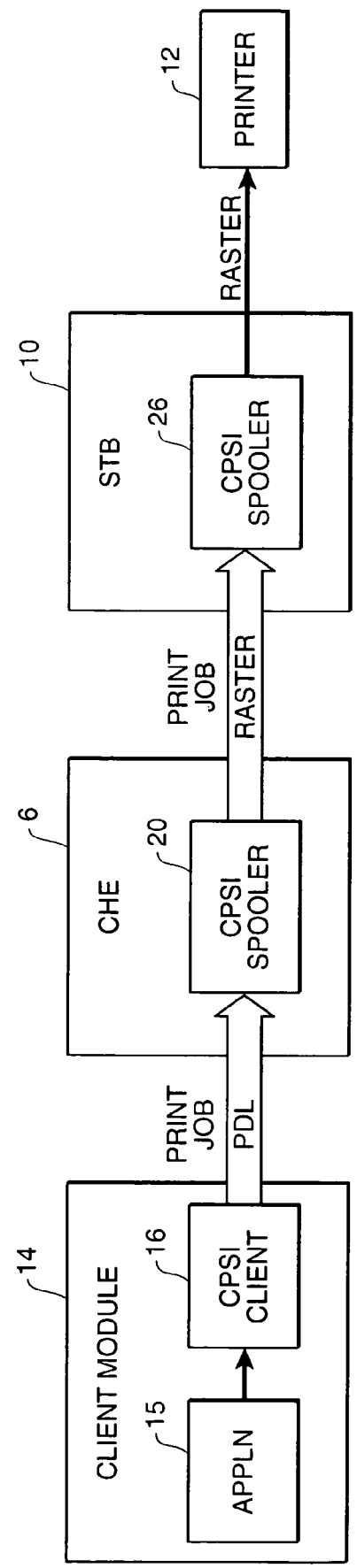
FIG. 4 shows the overall data flow of a print job from a client module through to its final delivery to a printer according to one embodiment of the present invention.

FIG. 4 shows the overall data flow of a print job from client module 14 such as a remote merchant or a client application executing at CHE 6, through to its final delivery to printer 12 at the home of the STB user. As shown in FIG. 4, client application 15 executing in client module 14 generates a print job addressed to one or more printers at one or more STBs. The print job is generated in a high level page description language (PDL) such as PostScript, PDF, HTML, or the like. High level printer languages such as these PDLs are preferred, since they are printer independent, thereby freeing the client application from a need for any knowledge of the configuration of the destination printer 12. The print job in PDL format is delivered over the aforementioned CPSI client 16 from the client module 14 out through to CHE 6 where it is eventually accepted by CPSI spooler 20. At CPSI spooler 20, the print job is rasterized based on knowledge of the configuration and type of destination printer 12, which in turn is obtained by CPSI spooler from preferences directory 21 based on the destination printer address provided by the client module. The rasterized print job is delivered over the aforementioned client/server relationship between CHE 6 and STB 10, where the rasterized print job is eventually accepted by CPSI spooler 26 at STB 10. From there, the rasterized print job is delivered to target printer 12 for printout thereby.

Figure 5:
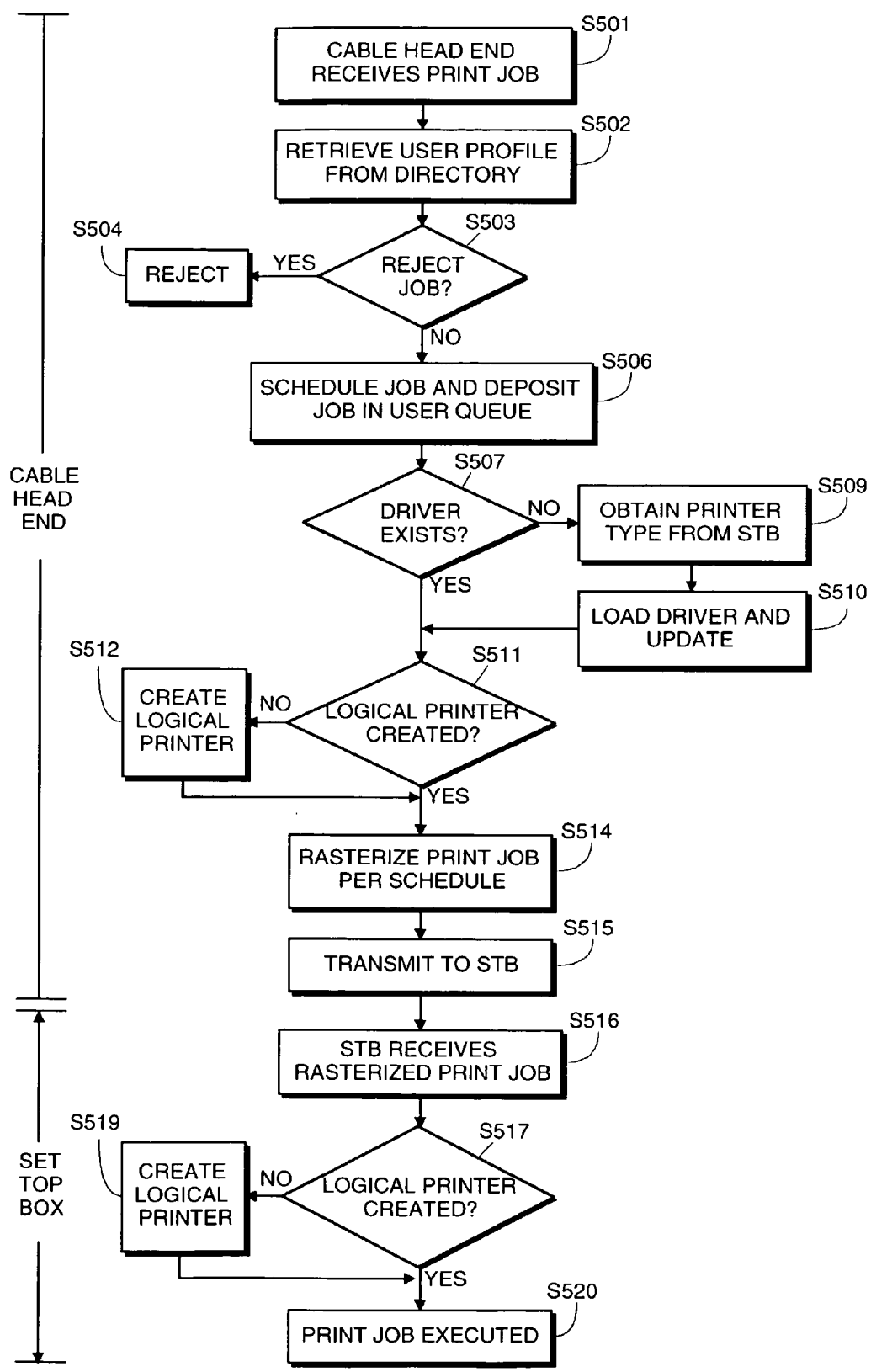
FIG. 5 is a flow chart for describing the overall data flow of a print job from a client module through to its final delivery to a printer according to one embodiment of the present invention.

FIG. 5 is a flow chart which illustrates this process in further detail. The process steps shown in FIG. 5 are stored on a computer readable medium such as an unshown memory at CHE 6 (for those steps performed by cable head end 6) or an unshown memory at STB 10 (for those process steps executed by set top box 10). Briefly, according to the process steps shown in FIG. 5, to print a print job received by a cable head end on a printer connected to a set top box that communicates with the cable head end over a high speed data communication network, the print job is received by the cable head end in a high level printer description language addressed to one or more such printers. Based on the address, the cable head end obtains a software driver for the printer, the software driver corresponding to configuration and type of the addressed printer. A logical printer is created in the cable head end (if a logical printer does not already exist), the logical printer corresponding to the software driver, and the logical printer is executed so as to rasterize the high level printer description language print job into a rasterized bit map image format. The rasterized bit map image format is transmitted over the high speed data communication network to the set top box addressed in the print job. At the set top box, the set top box creates a logical printer corresponding to its locally connected printer (if a logical printer does not already exist), with the logical printer accepting as its input the rasterized bit map image data. The rasterized bit map image data is sent to the set top box's logical printer, which in turn routes the print job to the locally connected printer.

In more detail, FIG. 5 shows steps S501 through S515 that are performed at CHE 6, and steps S516 through S520 that are performed at STB 10. In step S501, cable head end 6 receives a print job from a client application. The print job is preferably in a high level printer description language (PDL) which is printer independent. In addition, the print job includes one or more addresses identifying the destination or destinations for the print job. The addresses may be in any convenient format agreed to mutually between cable head end 6 and the client applications.

It is envisioned that the print jobs received by cable head end 6 are print jobs from merchants located remotely and connected to cable head end 6 via the internet. Examples of merchants and corresponding print jobs include a bank that prints out bank statements directly into a customer's home, utility companies that print out utility bills directly at a consumer's home, advertisers that printout advertisements and/or coupons directly at a consumer's home, newsletter/news clipping services that print out periodicals directly in a reader's home, and the like. It is also possible for the print job to be delivered from a client application executing at cable head end 6, for example, a client application 22 that generates a monthly cable guide for printout in a viewer's home, a news retrieval service which, based on automatic searches performed in accordance with user preferences over the internet, obtains news from a variety of internet sources, collates such news, and prints news out directly in a news reader's home, and the like. Multiple other arrangements are easily envisioned. What is preferable in the context of the invention, however, is that the print job is received by CPSI spooler 20 in cable head end 6 in a printer-independent format such as the aforementioned printer description languages.

In step S502, and based on the printer addresses received with the print job, CHE 6 accesses preferences directory 21 so as to retrieve user profiles for the users corresponding to the printers to which the print job is ultimately destined. User profiles preferably include at least an identification of printer configuration and type of printer 12 connected to the user's set top box. Other information may also be included in the user preference. One such piece of information is a blocking filter, which specifies filtering applied to the print jobs, thereby to permit a user to exclude unwanted print jobs. For example, so as to avoid a proliferation of unwanted print jobs at his home printer, a user may specify preferences instructing cable head end 6 to block print jobs from specific sources, or to allow print jobs only from specific sources. Any such preferences are applied in step S503 in which CHE 6 determines whether or not to reject the print job. If the job is rejected, flow branches to step S504 so as to reject the job and, possibly, to inform client module 14 that the job has been rejected.

If the print job is accepted for printout, flow advances to step S506 in which the print job is scheduled and deposited in the subscriber's queue, and the step S507 in which the cable head end determines whether a print driver exists for the printer to which the print job is destined. A print driver might not exist for a variety of reasons. One such reason is that the cable head end does not have available a software module corresponding to the printer defined in the user profile. In such a circumstance, cable head end 6 simply accesses an internet provider of such a software driver, such as an internet site corresponding to the printer manufacturer. One more common situation in which a driver might not exist, however, is a situation in which the user profile does not contain any identification of printer configuration or type. Such a situation is addressed in steps S509 and S510, to which CHE 6 branches in a situation where a driver does not exist for failure of the user profile to specify a printer.

Thus, in step S509, CHE 6 communicates directly (via CPSI spooler 20, CPSI client 38, and IPP client/server 24 and 25) to the destination STB 10, with a request for STB 10 to provide an identification of configuration and type for printer 12 connected to STB 10. STB 10 responds with the needed information, which is obtained by CHE 6. In step S510, CHE 6 loads the driver corresponding to the identification information provided from STB 10, and in addition updates the user profile in preferences directory 21, so that future print jobs can be performed more readily, without the need for communication with STB 10 for the purpose of determining printer identification.

In any event, once a driver exists, flow advances to steps S511 and S512, in which CPSI spooler 20 in CHE 6 determines whether a logical printer corresponding to the print driver already exists, or if one needs to be created. A logical printer will already exist if a prior print job has already been processed. Using the logical printer, CPSI spooler feeds the print job in the printer-independent PDL format to the logical printer, such that the logical printer rasterizes the print job into a printer-specific rasterized bit map image (step S514). It should be understood that the rasterized bit map image print job is not simply a fully bit map raster of the print job. Rather, the rasterized bit map print job is a bit-by-bit representation of the print job tailored specifically for the printer corresponding to the logical printer in CPSI spooler 20. As one example of printer-specific rasterization, many printers require print commands embedded in the print job, so as to enable control over the printer. Examples of such print commands include start-of-page, advance-down, eject-page, load-new-page, and the like. Such printer-specific commands are embedded in the rasterized print job. As a further example, some printers, such a bubble jet printers, print in bands, and embedded commands are needed so as to define such bands. As yet a further example, some bubble jet printers that print in color require print data to be supplied out of sequence for each different color, so as to accommodate physical differences in location between printing jets for one color relative to printing jets for another color. Whatever the source of printer specificity, the rasterized bit map print job created by the logical printer in step S514 is printer-specific, tailored directly based on the identity of printer configuration and type of printer 12.

Step S515 transmits the rasterized bit map print job to STB 10. As described above, the transmission to STB 10 is from CPSI spooler 20, via CPSI client 38, IPP client/server 24 and 25, to CPSI server 39 and spooler 26 in STB 10.

At the set top box, step S516 receives the rasterized bit map print job in CPSI server 39 and forwards it to CPSI spooler 26. If a logical printer does not already exist in CPSI spooler 26, then a logical printer is created based on the identity of printer type and configuration for attached printer 12 (steps S517 and S519). In step S520, CPSI spooler, using the logical printer, executes the rasterized bit map print job so as to send the print job to printer 12 where it is rendered into a visible printed image.

As described previously, the purpose of the CPSI architecture is to offer facilities that will enable applications running anywhere on the internet to print on printers attached to set top boxes. Such printing is referred to as "push printing" in the sense that the remote applications push print data through the cable head end to the set top box for printout at an attached printer.

Of course, it is possible to provide the set top box with its own printing capability, so as to enable a user to print data as desired. Such printing is referred to as "pull printing", in the sense that the user of the set top box pulls data for printout from sources remote from him. For example, a user may, as part of browsing the internet, come across a web page of interest, and may request printout of such a web page. Such printout is "pull printing" and is different from "push printing" described hereafter.

General printing goals of the architecture described above and hereinafter include the ability to support attachment and software and driving of any supported printer, as well as the elimination of any need for a user to intervene in installation of a printer beyond physical connection to the set top box. Because of a uniform API, software maintenance costs are reduced. In addition, by virtue of the CPSI software architecture, printing does not interfere with other programs running on the set top box, such as web browsing applications or television viewing. In addition, the CPSI architecture is portable across a variety of platforms, and supports a variety of different operating systems, particularly those operating systems that maintain execution in the set top box itself.

Push printing in particular represents a model in which print action is initiated by an entity other than the set top box user. It is assumed that this entity, which actually may either be local to the cable head end or be an internet citizen, owns the document for which the print job is desired, or is able to reference it. Two different printing modes are contemplated:

1. Unicasting, which refers to a point-to-point connection in which a remote internet site sends print data separately to each destination client; and 2. Multicasting, which refers to a mode in which a single copy of the print data is sent to multiple destination points. Multicasting can also include broadcasting, in which a single copy of print data is sent to all destination points rather than to a selected subcast thereof.

Examples of print jobs subject to push printing include merchant-initiated print jobs from remote internet sites. Such merchant-initiated print jobs may include constant content print jobs, such as a flyer advertising particular items for sale. The flyer can be printed in a unicast or multicast mode, and is delivered in the appropriate unicast or multicast mode from the cable head end to the appropriate set top boxes. Merchant initiated print jobs can also include variable content print jobs such as personalized statements like retailing, a bank statement or a utility bill. Based on a client application running at the merchant's server, the print job is created, and submitted to the cable head end. Again, the cable head end delivers the print job in either unicast or multicast mode, as requested by the print job to the set top box or boxes in question.

Generalized goals of merchant initiated printout from remote internet sites include the following. First, the merchant is able to submit the print job at its own internet site, by means of a client application running on the merchant's CPU. The merchant is able to specify parameters for the print job, including destination address and whether or not the transmission is via secured or unsecured transmission. The destination address may specify unicast or multicast printing, meaning that the destination address might identify only a single recipient, or might represent multiple recipients or a group of recipients. The print job is generated in non-proprietary device independent format, by use of widely available client applications, or even customized print applications, that print through standardized and device independent format. This is achieved through separation of the print submission client and the content creation tool: the content creation tool is left to the merchant, whereas the print submission client is embodied in the CPSI client described above. At the cable head end, resident software maintains a directory of user profiles in preferences directory 21, the profiles including subscriber name, subscriber account number, address, printer model, set top box capabilities, any blocking filters, and policy data. The CPSI spooler at the cable head end discards print jobs that meet criteria specified by blocking filter data, or accepts only print jobs that meet other specified criteria. A system administrator at the cable head end is able to display a print queue, indicating global print jobs for all cable subscribers, or print jobs on a per user basis. Using such a print queue, the system administrator is able to examine the status of jobs in the queue, and the status of corresponding printers attached to set top boxes, and is further able to delete jobs in the queue and override any of user selectable print options. The cable head end spooler does not commence a print job until it has ascertained that the set top box is ready to accept print data, and that the attached printer is ready and on line. Preferably, the CPSI spooler in the set top box is able to commence a print operation before the entire print job has been downloaded from the cable head end, and is further able to confirm successful completion of print jobs.

Figure 6A:
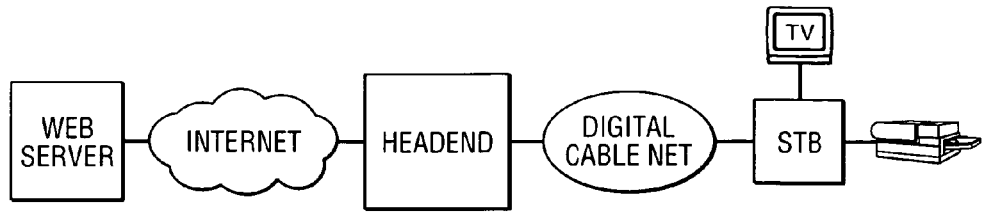
FIGS. 6A, 6B and 6C illustrate general arrangements for unicast (point-to-point) printing and multicast (one-to-many) printing according to one embodiment of the present invention.
Figure 6B:
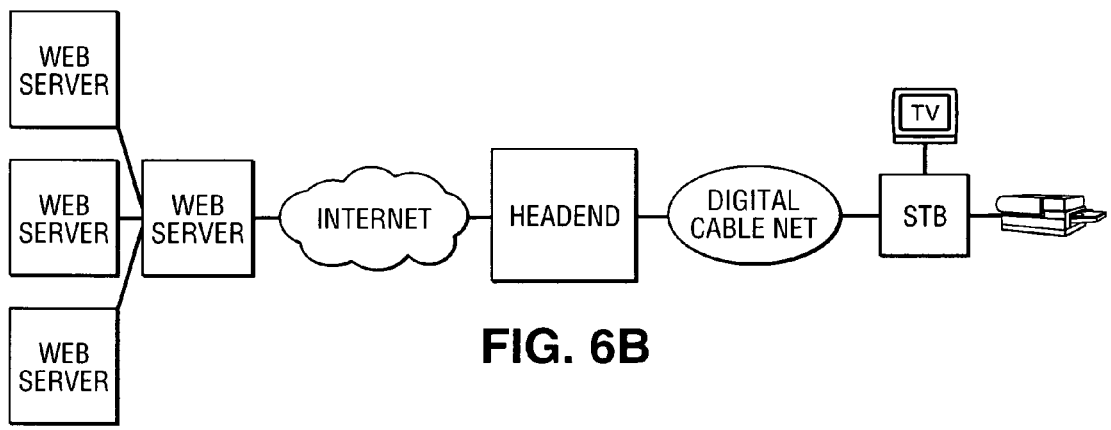
Figure 6C:
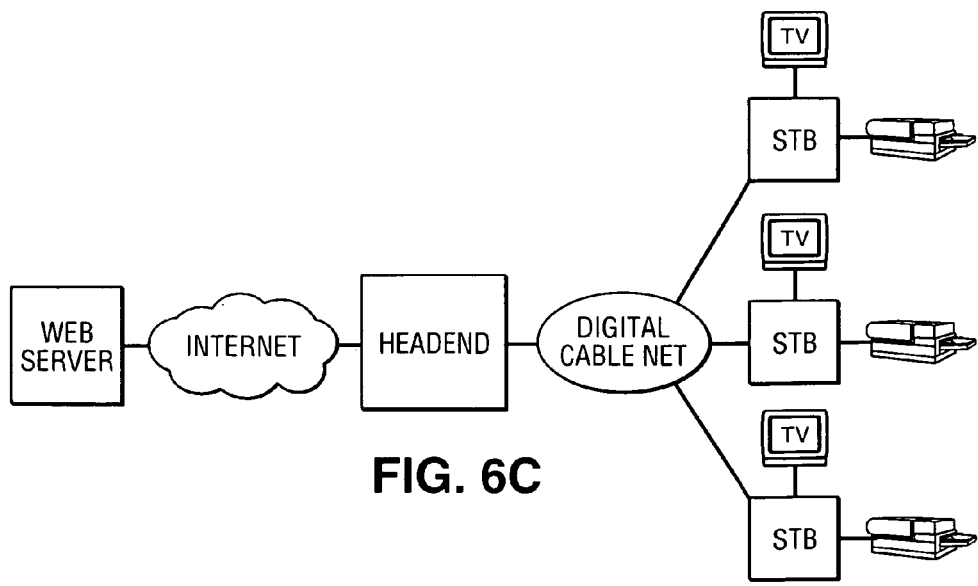

FIGS. 6A, 6B and 6C illustrate general arrangements for unicast (point-to-point) printing and multicast (one-to-many) printing. As shown in FIG. 6A, unicast printing involves printout of a print job from a remote web server to a specifically identified printer attached to a set top box. The print job is routed via the internet to the cable head end, and thence over the digital cable network to the set top box for printout at the destination printer. FIG. 6B illustrates an alternative form of unicast printing, in which a remote web server gathers data from multiple different web sites, aggregates the data into a single print job, and then push-prints the resulting print job to a destination printer. Of course, although the aggregating server is illustrated as a remote web server, it is possible for an aggregation application to execute within the cable head end, communicate over the internet to multiple different web sites for collection of aggregate data, to aggregate the data at the cable head end, and then to push-print the aggregated print job to a destination set top box.

FIG. 6C shows multicast printing in which a remote web server generates a print job having multiple destination printers. The print job is routed to the cable head end via the internet, which thereupon routes the print job, in a multicast or broadcast configuration, over the digital cable network to multiple different set top boxes for printout by respective printers attached thereto.

Figure 7A:
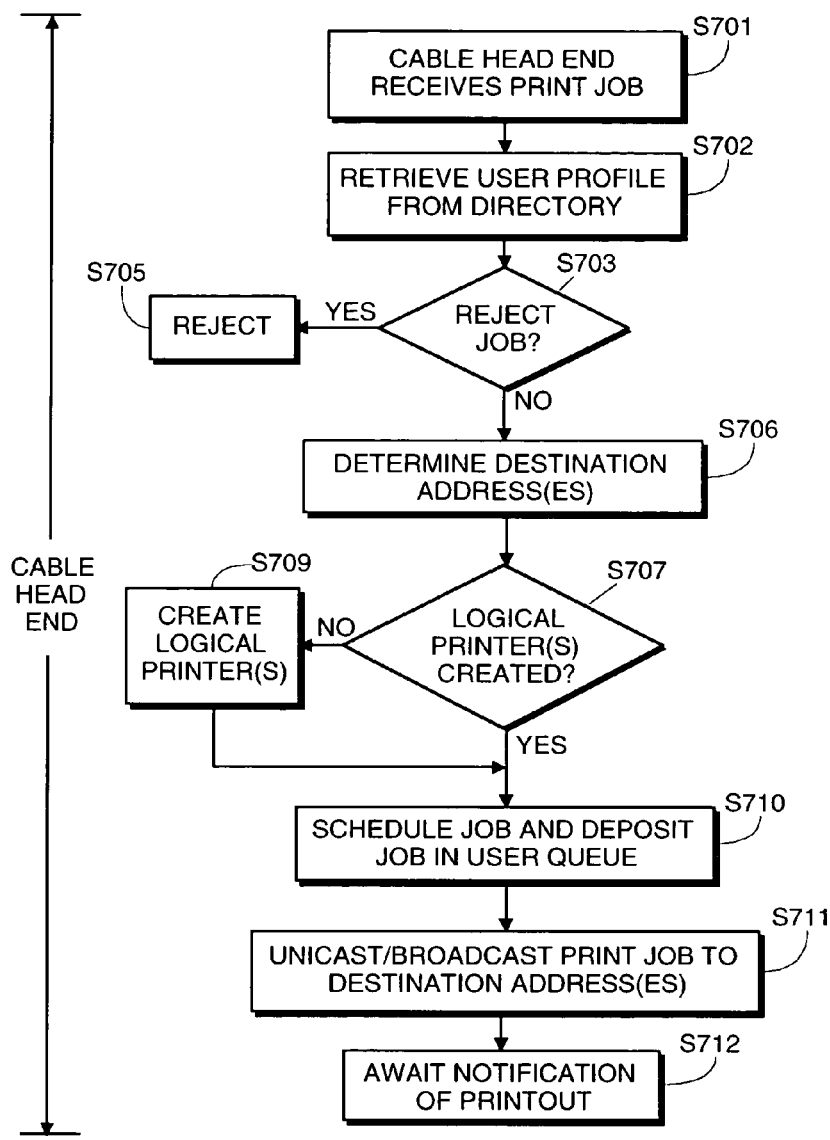
FIGS. 7A and 7B are flow charts showing respective processing by the cable head end and by the set top box in response to a print job according to one embodiment of the present invention.
Figure 7B:
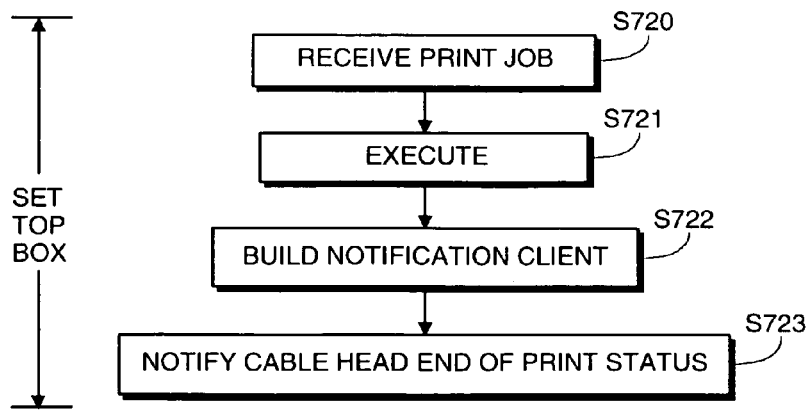

FIGS. 7A and 7B are flow charts showing respective processing by the cable head end and by the set top box in response to a print job. Referring first to FIG. 7A, step S701 illustrates receipt by the cable head end of a print job from a remote internet source, or from an application such as 22 at the cable head end. In step S702, the cable head end retrieves the user profile from directory 21 (FIG. 2). Based on the user profile, cable head end determines (in step S703) whether or not to accept or to reject the job. If the job is rejected, flow advances to step S705 and the job is not processed further. It is possible for step S705 to send information back to the upstream remote internet site, indicating that the job has been rejected.

On the other hand, if the job has not been rejected, flow advances to step S706, in which, based on destination information included with the print job, the cable head end determines the destination address or addresses for the print job. Steps S707 and S709 create logical printers if they are needed. That is, if a corresponding logical printer or printers do not already exist in spooler 20, the needed logical printer or printers are created in CPSI spooler 20 (FIG. 2), with a separate logical printer being created for each different printer needed to accomplish the unicast or multicast printing. That is, in a unicast mode, since only a single printer is involved, then only a single logical printer corresponding to the printer in question is created. On the other hand, in a multicast or broadcast mode, multiple users and multiple printers are the destination for the print job. It is possible, however, for several of the multiple users to employ the exact same printer and printer configuration. As a consequence, although it is likely that multiple logical printers are created in the CPSI spooler at the cable head end, it is equally likely that a single logical printer will be able to support several users because each of the several users will have exactly the same printer type and configuration.

The print job is thereafter scheduled and deposited into the user's queue (step S710), for rendering by the logical printers (or spooled for subsequent rendering just prior to delivery to the STB). It is possible to render the print jobs into a bit map rasterized format, as discussed above in connection with FIG. 5, but this is not ordinarily necessary. Rather, all that is necessary is for the logical printers to process the print job for subsequent use by the set top boxes.

In step S711, the print job from each logical printer is unicast or broadcast to the destination address or addresses. Thereafter, in step S712, the cable head end builds a notification server so as to await notification of printout from each of the set top boxes to which print data has been transmitted.

FIG. 7B illustrates process steps performed by the set top box in response to receipt of a print job transmitted from the cable head end over the digital cable network. Thus, in response to receipt of a print job (step S720), the set top box executes the print job (step S721) so as to print the print job on its attached printer. It is possible for the set top box to utilize the CPSI spooler arrangement discussed above in connection with FIG. 5, but this is not mandatory. Rather, according to this aspect of the invention, it is only necessary for the set top box to receive the print job and to cause its attached printer to print it.

In step S722, the set top box builds a notification client for communication with the corresponding confirmation server built at the cable head end in connection with step S712. The notification client in the set top box then communicates with the notification server at the cable head end (step S723) so as to notify the cable head end of ongoing print status. In particular, the notification client at the set top box notifies the cable head end as each sheet of the print job is commenced, as each sheet is concluded, and as the print job is concluded. In addition, the notification client permits interaction from the user at the set top box, whereby the user at the set top box can modify his print queue by cancelling jobs or advancing jobs out of sequence from the queue.

At the cable head end, and based on information received from the notification client at the set top box, the cable head end can distribute print status information as appropriate. For example, it is possible for the cable head end to transmit print status back to the originating merchant at the remote internet site, so as to permit the merchant to confirm that the print job has been successfully completed. Alternatively, or in addition, it is possible for the cable head end to utilize the print status information so as to monitor, maintain and manage print queues for each and every one of the set top boxes connected to the digital cable network.

Figure 8:
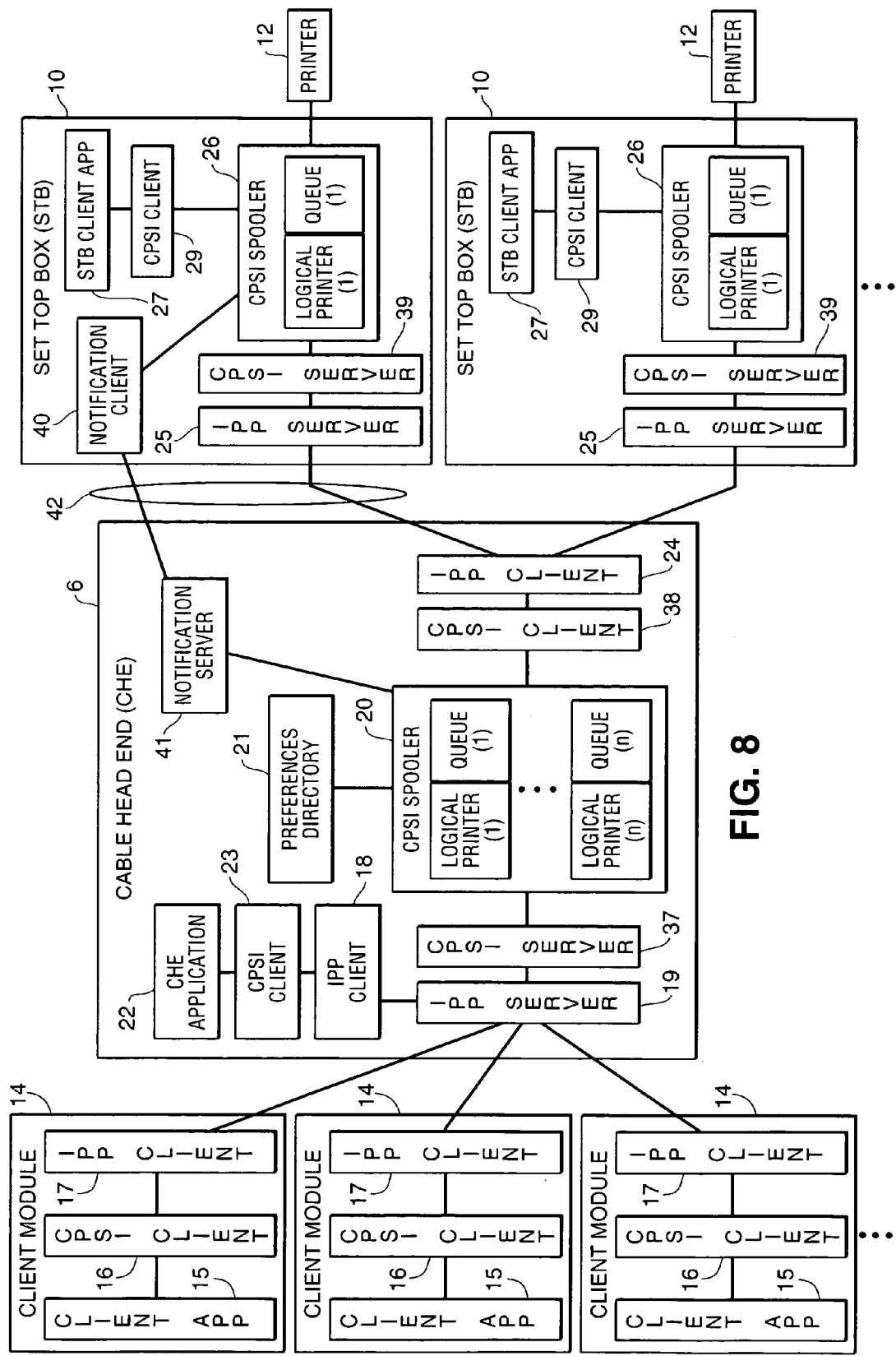
FIG. 8 illustrates the relationship of the confirmation client created in the set top box and the confirmation server created in the cable head end according to one embodiment of the present invention.

FIG. 8 illustrates the relationship of the notification client created in the set top box and the notification server created in the cable head end. In FIG. 8, the same reference numerals as those used in FIG. 2 are utilized whenever the functions are the same. What is shown further in FIG. 8 is notification client 40 created by set top box 10, for monitor of the status of the print job being spooled to printer 12 by CPSI spooler 26. Notification client 40 transmits printer status information back to notification server 41 in CHE 6 for use by CPSI spooler 20 to monitor and manage print queues, and to provide notification information of successful printout back to client modules 14. Notification client 40 and notification server 41 communicate over the digital cable network 42, using the same physical wire as that used by IPP client and server 24 and 25.

By virtue of the foregoing arrangement, push printing from remote internet sites is facilitated at printers connected to set top boxes that are fed data from a cable head end and via a digital cable network. The push printing can be unicast or multicast. In addition, notification of print status is provided from the set top box back to the cable head end, thereby permitting confirmation of printout to the remote internet merchant, or maintenance and management of print queues from the cable head end.

The configurations described above for the present invention are provided to allow printing from client module 14 to STB 10 via CHE 6, wherein the print data is formatted for printing on printer 12 either at CHE 6 by CPSI spooler 20 or at the client application 15 of client module 14. In those configurations, the print data is generally provided to STB 10 in a rasterized format required for printing directly to printer 12 without the need for utilizing printer driver 33 in STB 10. The utilization of printer driver 33 in STB 10 is necessary, however, when a user of STB 10 wishes to print locally, such as when printing a web page that the user is viewing on the television to which STB 10 is attached. Printer driver 33 in STB 10 is also necessary in instances when print data is provided from CHE 6 to STB 10 in a device-independent format. In such situations, and in others not discussed herein, the use of printer driver 33 in STB 10 is required.

Depending on the capabilities of STB 10, printer driver 33 could be loaded in a variety of ways. For example, if the set top box has sufficient memory capacity, a number of printer drivers could be pre-loaded into the memory of STB 10 for several different printers. In the alternative, STB 10 may allow a floppy disk drive or CDROM, or the like, to be interfaced to STB 10 such that printer driver 33 could be accessed from a floppy disk or CDROM. As discussed above, the limited hardware resources of STB 10 limit the functional capabilities of printer driver 33. Accordingly, printer driver 33 has a limited ability, if any, to support a graphic user interface to allow a user of STB 10 to interact with printer driver 33. As previously mentioned, printer driver 33 generally does not support a graphic user interface in order to allow a user of STB 10 to instruct printer 12 to perform maintenance functions for maintaining printer 12 in a good printing condition. Printer driver 33 may be provided to STB 10 by an external medium, such as a floppy disk or a CD-ROM, or through the browser application from applications 36. In the alternative, printer driver 33 may be provided to STB 10 from CHE 6 via a plug-and-play mechanism, as described in more detail below.

In the set top box environment of the present invention, it is appreciated that a user may prefer to utilize the digital cable network in order to obtain and load a printer driver. Therefore, the present invention provides a manner in which to provide a remote plug-and-play service whereby CHE 6 locates and provides an appropriate printer driver to STB 10 upon request by STB 10, thereby supporting the attachment of a local printer to STB 10.

Figure 9:
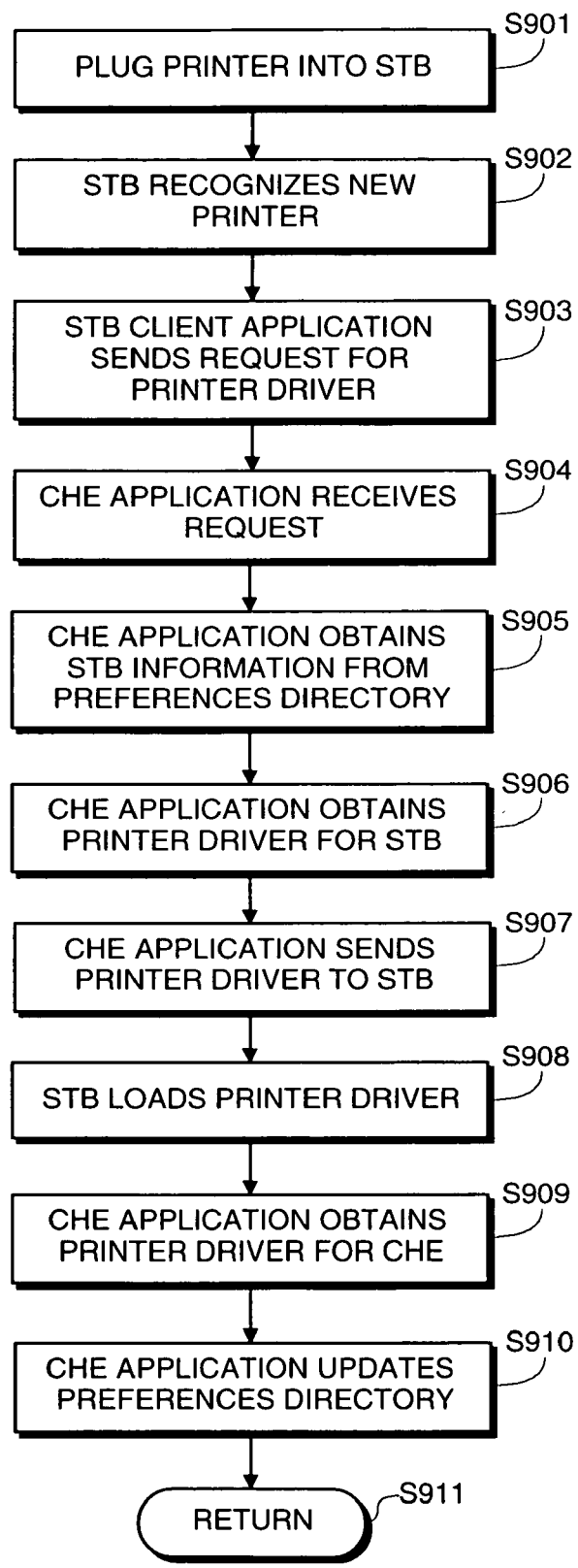
FIG. 9 is a flow chart for describing a remote plug-and-play feature for supporting one embodiment of the present invention.

This feature of the present invention is described in FIG. 9, which depicts a sequence of steps for accomplishing a preferred embodiment of the remote plug-and-play feature for supporting a local printer attached to STB 10. In step S901, the subscriber plugs printer 12 into STB 10 via the interface provided by STB 10 for printers. This interface may comprise a universal serial bus (USB), an RS-232 interface, or other printer connection. Next, in step S902, STB 10 determines that a new printer has been plugged in and that STB does not have a printer driver corresponding to the new printer. This detection is achieved via hardware interface 31 and operating system 32 of STB 10. Client application 27 of STB 10 obtains an indication from operating system 32 that a printer driver is needed for printer 12. STB client application 27 then sends a request to CHE 6 to obtain a printer driver that corresponds to printer 12. The request is sent from STB 10 to CHE 6 via the digital cable network, but not necessarily through the IPP protocol, because print data is not involved in this transaction. Therefore, it can be appreciated that any of the underlying transport protocols such as TCP/IP, may be utilized to send the request from STB client application 27 in STB 10 to CHE application 22 in CHE 6 (step S903).

It should be noted that the request for printer driver from STB client application 27 preferably includes the information necessary to identify printer 12, such as the manufacturer and model of printer 12. Next, in step S904, CHE application 22 receives the request for printer driver from STB 10. CHE application 22 then accesses preferences directory 21 to obtain hardware and operating system information which describes STB 10 (step S905). This information is necessary to determine which type of printer driver should be obtained and sent to STB 10. For instance, the set top box may comprise one of several currently available set top boxes, such as the Explorer 2000 by Scientific Atlanta, the DCT 5000+ by General Instrument, and the Streammaster by Motorola. In addition, the appropriate printer driver must correspond to the operating system implemented in the set top box. For instance, the Explorer 2000 utilizes the Power TV operating system, the DCT 5000+ utilizes the WinCE operating system, and Streammaster utilizes either the MicroWare or the Open TV operating system.

In step S906, CHE application 22 obtains a printer driver that is appropriate for the manufacturer and model of printer 12 and for the hardware type and operating system of STB 10. CHE application 22 may obtain this printer driver from one of many sources. For example, the needed printer driver may already be stored in a memory of CHE 6 and accessible via preferences directory 21 for another subscriber on the digital cable network. In the alternative, CHE 6 may have several printer drivers available in a memory device such as a hard drive, CDROM, or the like. In another alternative, CHE application 22 may utilize internet proxy 5 to access world wide web 4 so as to obtain the necessary printer driver for STB 10, such as from the printer manufacturer's web site. Once the appropriate printer driver is found by CHE application 22, CHE application 22 then sends the printer driver to STB 10 via the digital cable network (step S907). As mentioned previously, any of the available transport protocols for communication between CHE 6 and STB 10 may be utilized to download the printer driver from CHE 6 to STB 10. Once STB 10 receives the printer driver, STB 10 loads the printer driver in local memory for subsequent use and registers the printer driver with operating system 32 of STB 10 for future reference (step S908).

In step S909, CHE 6 obtains another printer driver for use by CHE 6 to send print data to STB 10. CHE 6 determines which printer driver to obtain for its own use based upon the information describing printer 12 provided by STB 10 and based upon the type of hardware and operating system which comprise CHE 6. As described above, CHE 6 may obtain the printer driver from any one of several resources, such as world wide web 4. CHE application 22 updates preferences directory 21 so as to record the new printer driver that corresponds to printer 12 for use by CHE 6 (step S910). Flow then passes to return in step S911. In this manner, CHE 6 maintains a printer driver which corresponds to printer 12 so that CHE 6 may render print data appropriately the next time print data is provided from CHE 6 to STB 10 for printing on printer 12. In addition, this feature of the present invention also provides an easy and transparent plug-and-play mechanism for the user of STB 10 to connect and utilize printer 12 to STB 10.

Figure 10:
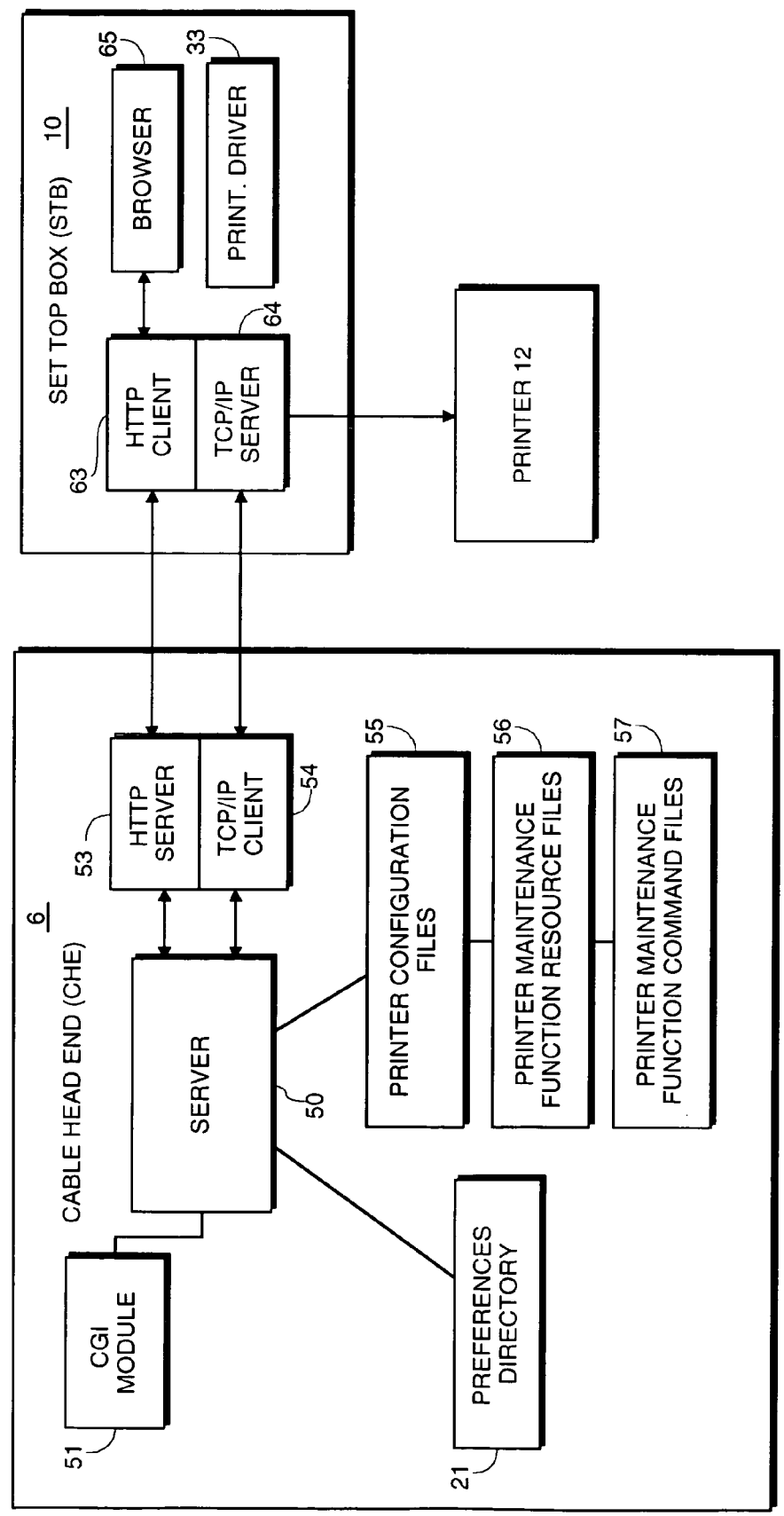
FIG. 10 is a block diagram for explaining the printer maintenance scheme according to one embodiment of the present invention.

FIG. 10 is a block diagram for explaining the printer maintenance scheme of the present invention. As seen in FIG. 10, cable head end (CHE) 6 and set-top box (STB) 10 are provided as previously depicted in FIG. 2. Printer 12 is attached to STB 10. Server 50 resides in CHE 6 and is utilized to access printer configuration files, construct HTTP-based web pages, and send appropriate printer commands according to the present invention. In this regard, printer configuration files 55, printer maintenance function resource files 56, and printer maintenance function command files 57 are also provided in CHE 6. Printer configuration files 55 are a plurality of conventional printer configuration files wherein each file corresponds to a particular type of printer. Such printer configuration files are different from conventional configuration files in that they have an extension appended to them to contain printer maintenance information to support the printer maintenance scheme of the present invention. This extension and corresponding data are discussed in more detail with respect to FIG. 11 below. Printer maintenance function resource files 56 contain image data for placing an image into an HTTP-based page, such as an icon, text or a small picture. Printer maintenance function command files 57 contain a plurality of command files each of which corresponds to a different type of printer. Each printer maintenance function command file contains a set of command instructions to be executed by the corresponding to accomplish a particular printer maintenance function.

Preferences directory 21 was discussed previously in FIG. 2, and is used to cross-correlate a particular set-top box in the digital cable network environment with the corresponding printer attached to that particular set-top box. For example, preferences directory 21 indicates that STB 10 has attached printer 12. Accordingly, server 50 utilizes preference directory 21 to identify the type of printer which is attached to a particular set-top box. CGI module 51 is utilized by server 50 to construct an HTTP-based web page for supporting the printer maintenance scheme of the present invention. HTTP server 53 is a conventional server utilized to accommodate the HTTP protocol. In a similar fashion, TCP/IP client 54 is a conventional client used to support communication via the TCP/IP protocol. It can be appreciated that protocols other than TCP/IP may also be used for communication between CHE 6 and STB 10, such as UDP and the like.

Correspondingly, STB 10 has HTTP client 63 and TCP/IP server 64 to support the HTTP and TCP/IP protocols, respectively. In addition, STB 10 has browser 65 and printer driver 33 which reside in applications 36 of STB 10. As can be seen in FIG. 10, browser 65 is provided to allow a user of STB 10 to access web pages provided to STB 10 via CHE 6. Printer driver 33 is a stripped-down, limited printer driver for supporting printer 12 for printing print jobs initiated by a user of STB 10. As discussed previously, printer driver 33 is unable to provide a graphic user interface for supporting user-initiated printer maintenance functions. For this reason, the network-centric printer maintenance scheme of the present invention is provided to allow a user of STB 10, or another network user such as a network administrator, to initiate printer maintenance functions of printer 12.

The arrangement depicted in FIG. 10 therefore allows a user of STB 10 to access a general top-level web page and select printer maintenance in order to perform printer maintenance on printer 12. A printer maintenance request is sent in response to the user's selection to CHE 6 via HTTP client 63 and HTTP server 53. Server 50 then receives the printer maintenance function request from STB 10 and selects one of printer configuration files 55 which corresponds to printer 12. Server 50 utilizes preference directory 21 and information contained in the printer maintenance request to select the appropriate printer configuration file which corresponds to printer 12. Once the appropriate printer configuration file is selected, server 50 utilizes CGI module 51 to build a web page incorporating printer maintenance command information, and other related information, from the appropriate printer configuration file. The constructed web page is then sent from server 50 to STB 10 via HTTP server 53 and HTTP client 63.

Then, the user of STP 10 selects one of the printer maintenance functions displayed on the printer maintenance web page sent from server 50. Server 50 then runs a CGI script based on the appropriate one of printer maintenance function command files 57. Accordingly, an appropriate printer maintenance command is sent from server 50 to STB 10 via TCP/IP client 54 and TCP/IP server 64 in correlation to the selected printer maintenance function by the user of STB 10. STB 10 then sends the received printer maintenance function command directly to printer 12, upon which printer 12 executes the printer maintenance function corresponding to the printer maintenance command.

Figure 11:
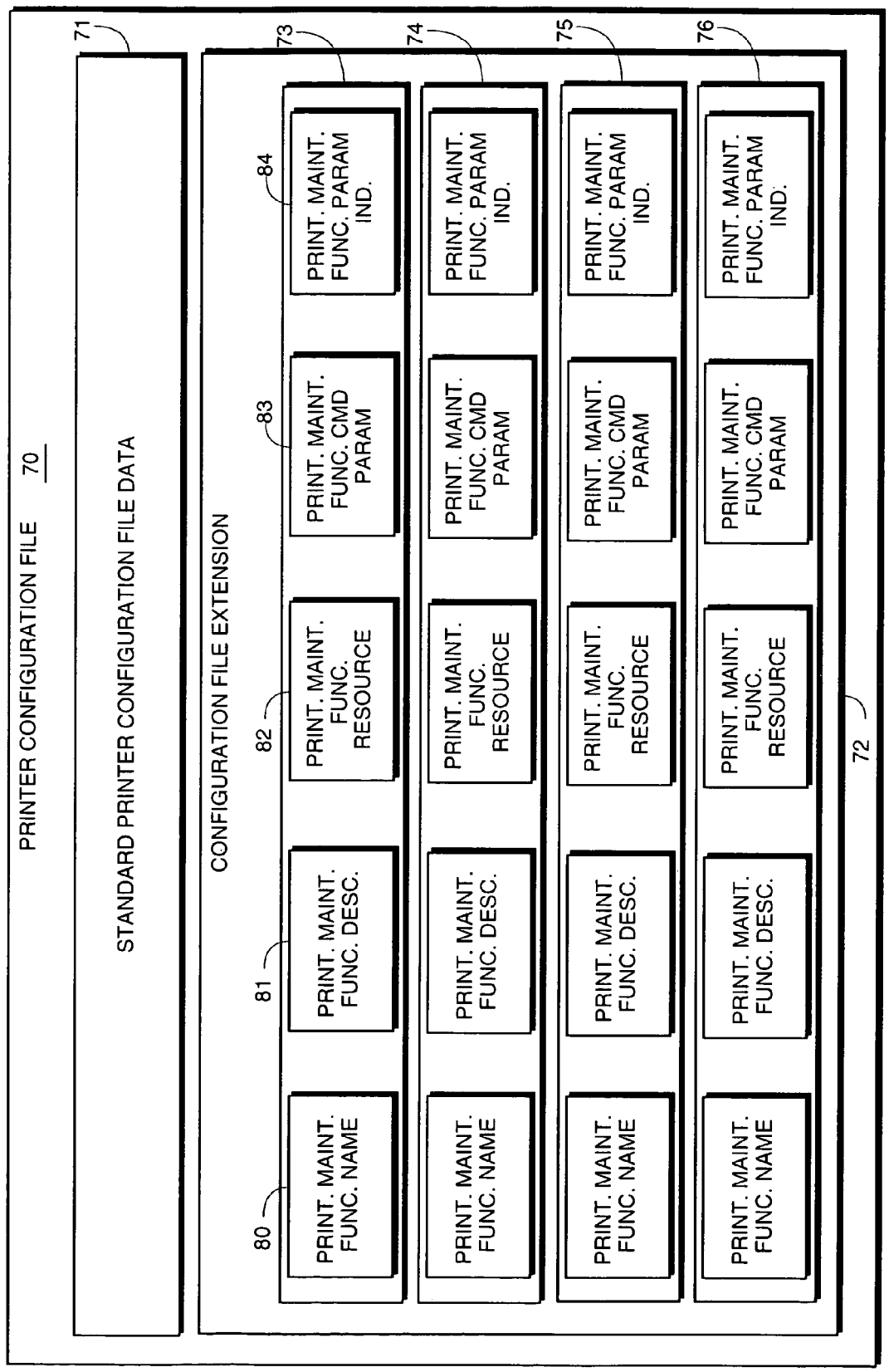
FIG. 11 is a block diagram for explaining a printer configuration file according to one embodiment of the present invention.

FIG. 11 provides a detailed view of one of printer configuration files 55. In particular, printer configuration file 70 is depicted in FIG. 11 for explaining the contents of each of printer configuration files 55. As can be seen in FIG. 11, printer configuration file 70 includes standard printer configuration file data 71 to reflect that printer configuration file 70 is based on a standard printer configuration file, such as a ".ppd" file, with the exception that it includes an extension to contain printer maintenance information to support the printer maintenance scheme of the present invention. Other standard printer configuration files can also be used with the present invention, provided that they include a similar extension containing printer maintenance information. Accordingly, configuration file extension 72 is also provided in printer configuration file 70 to contain the printer maintenance information. As can be seen in FIG. 11, configuration file extension 72 contains a plurality of printer maintenance function data sets, each of which corresponds to a separate printer maintenance function supported by the printer corresponding to printer configuration file 70. Accordingly, printer maintenance function data sets 73, 74, 75 and 76 are provided in configuration file extension 72 to correspond to each of the printer maintenance functions. In each one of printer maintenance function data sets 73 to 76, a plurality of data entries are provided which are related to the printer maintenance function corresponding to the particular maintenance function data set. In particular, printer maintenance function name 80, printer maintenance function description 81, printer maintenance function resource 82, printer maintenance function resource 82, printer maintenance function command parameter 83, and printer maintenance function command parameter indicator 84 are provided in each of the printer maintenance function data sets 73 to 76.

Printer maintenance function name 80 provides a name corresponding to the printer maintenance function of the particular printer maintenance function data set. For example, printer maintenance function name 80 might represent the printer maintenance function "clean heads". Accordingly, printer maintenance function description 81 contains a text description of the printer maintenance function represented by the particular printer maintenance function data set. Printer maintenance function resource 82 is a file name to represent one of printer maintenance function resource files 56. Each of printer maintenance function resource files 56 contains image data for representing an icon, text or an image to be placed into an HTTP-based web page corresponding to printer configuration file 70 according to the present invention. Printer maintenance function command parameter 83 can either represent a command which is used by a corresponding printer, such as printer 12, to carry out the printer maintenance function represented by the particular printer maintenance function data set, or can represent one of printer maintenance function command files 57. As previously mentioned, each of printer maintenance function command files 57 contains a series of commands necessary to perform a particular printer maintenance function. Printer maintenance function parameter indicator 84 is used to inform server 50 whether printer maintenance function command parameter 83 represents a command or represents one of printer maintenance function command files 57. In this manner, printer maintenance function parameter indicator 84 can be set to one of two values in order to reflect this indication. Therefore, configuration file extension 72 provides data corresponding to each of the printer maintenance functions supported by the printer to which printer configuration file 70 corresponds.

Figure 12:
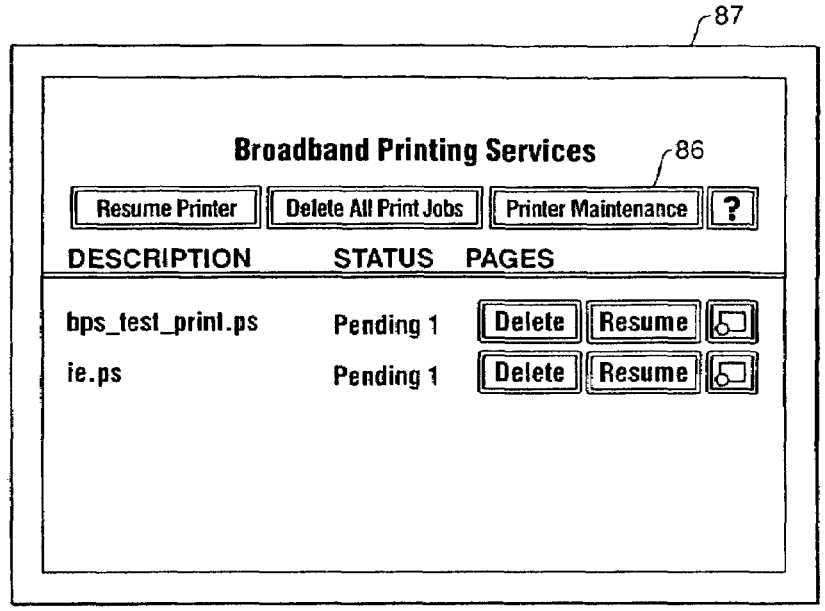
FIGS. 12 and 13 are views for explaining the web pages for supporting the printer maintenance scheme according to one embodiment of the present invention.
Figure 13:
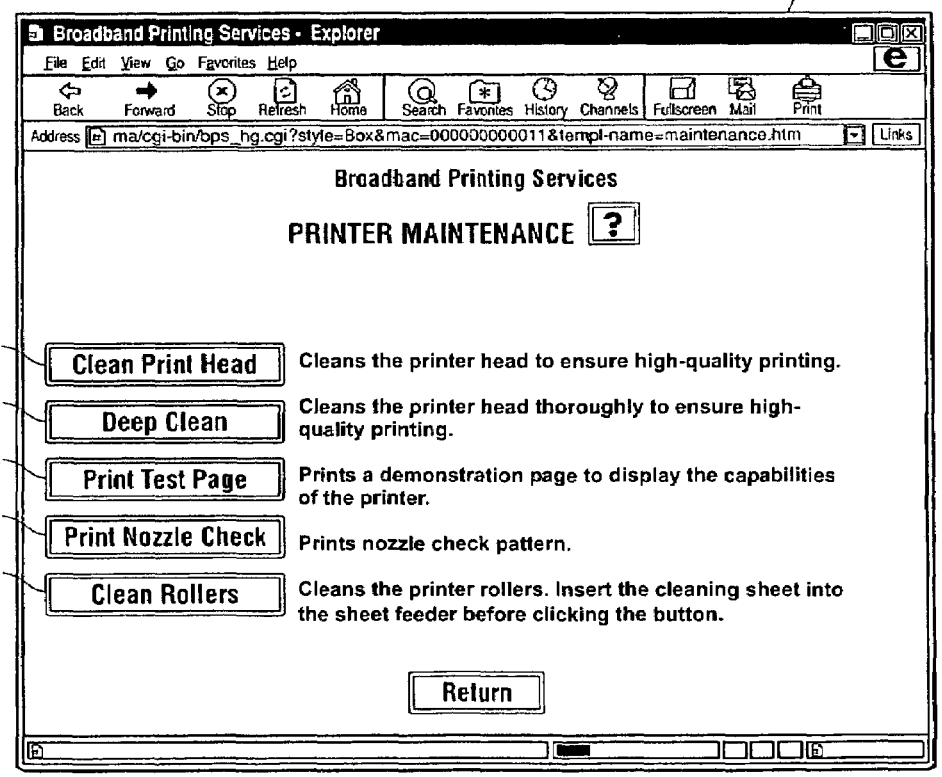

FIGS. 12 and 13 are examples of HTTP-based web pages which are generated by server 50, by using CPI module 51, according to the present invention. FIG. 12 represents generic top-level broadband printing services web page 87 which a user of STB 10 can select via browser 65. In this regard, web page 87 is provided from server 50 via HTTP server 53 and HTTP client 63 to STB 10. If the user of STB 10 wants to perform printer maintenance, the user simply selects printer maintenance icon 86 on web page 87. FIG. 13 is an example of HTTP-based web page 88 which is generated by server 50 based on an appropriate one of printer configuration files 55 in response to the selection of printer maintenance icon 86. Server 50 then sends printer maintenance web page 88 to STB 10. As seen in FIG. 13, CGI module 51 has extracted appropriate printer maintenance information from configuration file extension 72 of printer configuration file 70 and represented the information in printer maintenance web page 88. For example, web page 88 contains printer maintenance function links 91 to 95 corresponding to printer maintenance information contained in each of the printer maintenance function data sets of configuration file extension 72. Accordingly, clean print head link 91, deep clean link 92, print test page link 93, print nozzle check 94, and clean rollers link 95 are provided on web page 88 along with corresponding descriptions. This information was taken directly from printer maintenance function name 80, printer maintenance function description 81, and printer maintenance function resource 82 of each of the printer maintenance function data sets in configuration file extension 72 of one of printer configuration file sets 55.

Figure 14:
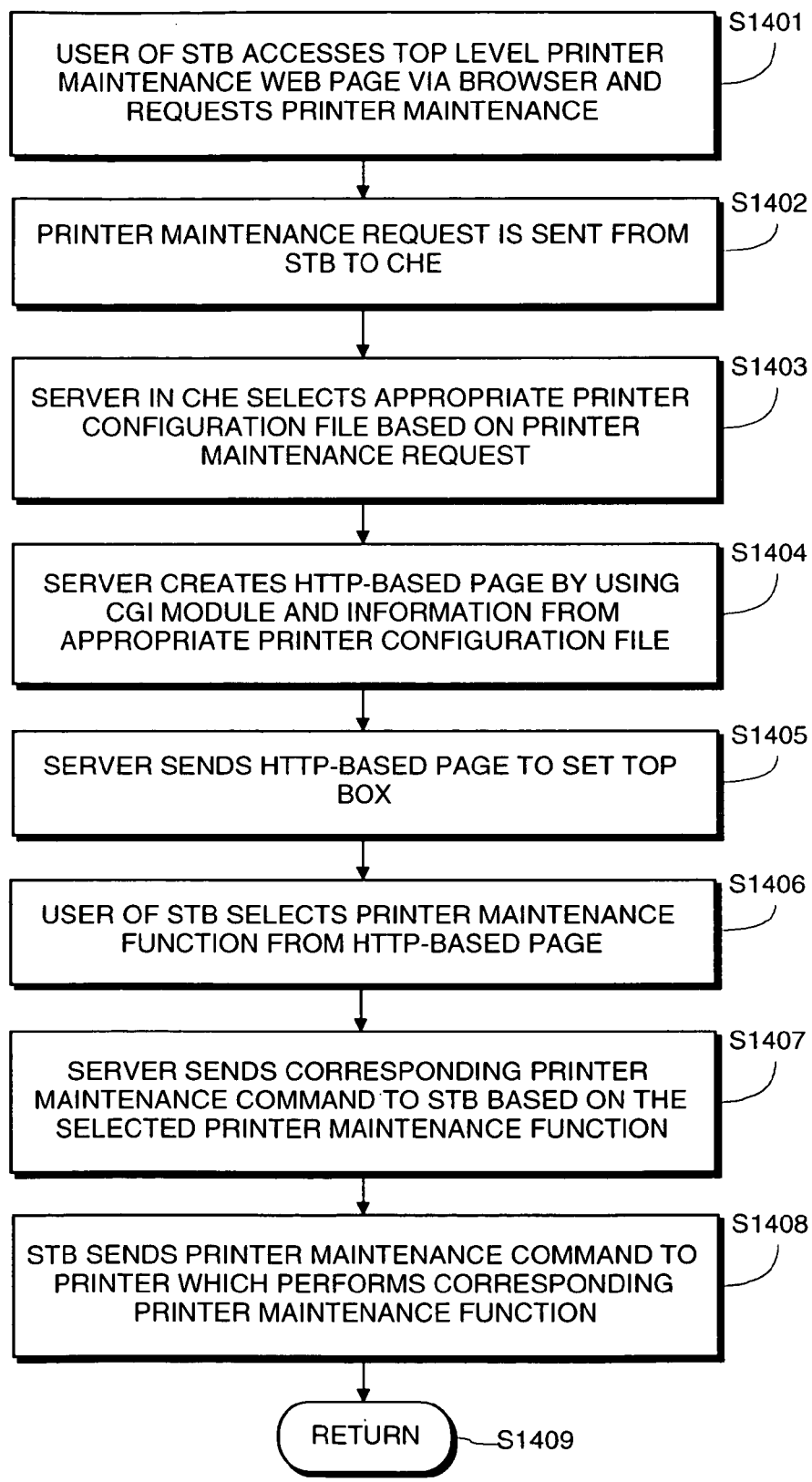
FIG. 14 is a flow chart for describing the printer maintenance scheme according to one embodiment of the present invention.

FIG. 14 is a flowchart for explaining the operation of the printer maintenance function scheme according to the present invention. First, the user of STB 10 accesses top-level printer maintenance web page 87 via browser 65 from server 50. The user requests printer maintenance by selecting printer maintenance icon 86 on web page 87 (step S1401). In step S1402, a printer maintenance request is sent in response to the user's selection to server from STB 10 via HTTP client 63 and HTTP server 53. Server 50 then selects an appropriate one of server configuration files 55 in response to the printer maintenance request (step S1403). Server 50 makes the selection based upon information contained in the printer maintenance request which identifies STB 10, and also based upon information in preferences directory 21 which provides information regarding the type of printer, such as printer 12, which is attached to STB 10. Server 50 thereby selects a printer configuration file, such as printer configuration file 70, which corresponds to printer 12. Next, in step S1404, server 50 creates an HTTP-based web page by utilizing CGI module 51 in conjunction with information contained in configuration file extension 72 of printer configuration file 70. In particular, printer maintenance function links are provided in web page 88 which correspond to printer maintenance file data sets 73 to 76. Server 50 then sends the generated HTTP-based web page containing the printer maintenance function links 91 to 95 to STB 10 via HTTP server 53 and HTTP client 63.

The user of STB 10 then views the generated web page 88 via browser 65 and selects one of the printer maintenance functions displayed on the web page (step S1406). In response to the selection by the user of STB 10, server 50 identifies the appropriate printer maintenance function data set, such as printer maintenance file data set 73, corresponding to the selected printer maintenance function. Server 50 then interrogates printer maintenance function parameter indicator 84 to determine whether printer maintenance function command parameter 83 is a command or is a name of one of printer maintenance function command files 57. If printer maintenance function command parameter 83 is indicated as being a command, the command is sent directly from server 50 to STB 10 via TCP/IP client 54 and TCP/IP server 64 (step S1407). If printer maintenance function command parameter 83 is indicated as being one of printer maintenance function command files 57, server 50 opens the corresponding one of printer maintenance function command files 57 and executes the commands therein via a CGI script and sends the corresponding commands to STB 10 via TCP/IP client 54 and TCP/IP server 64 (step S1407).

In step S1408, STB 10 receives the printer maintenance function commands from server 50 and passes them on to printer 12 in order to perform the corresponding printer maintenance function which was selected by the user of STB 10. Flow then passes to return in step S1409.

In this manner, a printer maintenance scheme is provided according to the present invention in order to allow a user of STB 10 to access printer maintenance functions for maintaining printer 12 in a good printing condition even though printer driver 33 in STB 10 does not provide a graphic user interface to support such printer maintenance functions.

It is emphasized that several changes and modifications may be applied to the above-described embodiments, without departing from the teaching of the invention. It is intended that all matter contained in the present disclosure, or shown in the accompanying drawings, shall be interpreted as illustrative rather than limiting. In particular, it is to be understood that any combination of the foregoing embodiments may be utilized, so that the specifics of any one embodiment may be combined with any of the other or several other embodiments.

The invention has been described with particular illustrative embodiments. It is to be understood that the invention is not limited to the above-described embodiments and that various changes and modifications may be made by those of ordinary skill in the art without departing from the spirit and scope of the invention.

What is claimed is:

1. A method for supporting printer maintenance in a network environment having a server, at least one network device and a printer, the server containing a plurality of printer configuration files, said method comprising the steps of:

accessing one of the printer configuration files which corresponds to the printer, the configuration file including a plurality of printer maintenance function names and a plurality of printer maintenance commands corresponding to the printer maintenance function names;

generating an HTML-based page corresponding to the printer, the HTML-based page containing each of the printer maintenance function names from the accessed printer configuration file; and sending the HTML-based page to the network device, wherein, upon selection in the network device of one of the printer maintenance function names in the HTML-based page, the server sends to the printer the printer maintenance command which corresponds to the selected printer maintenance function name, and wherein each of the printer configuration files includes a plurality of printer maintenance function data sets, wherein each printer maintenance function data set includes a printer maintenance function name, and a printer maintenance function command parameter, further including a command parameter indicator which, when set to a first value, indicates that the printer maintenance function command parameter is a printer maintenance function command and, when set to a second value, indicates that the printer maintenance function command parameter represents a command file containing a printer maintenance function command.

2. A method according to claim 1, further including the step of receiving a printer maintenance request from the network device, the printer maintenance request containing a reference to the printer.

3. A method according to claim 2, wherein the accessing step is performed in response to receipt of the printer maintenance request.

4. A method according to claim 1, wherein each of the printer configuration files has a standardized data format.

5. A method according to claim 4, wherein the standardized data format is an industry standard format.

6. A method according to claim 4, wherein the standardized data format includes an industry standard format and an extension to the industry standard format.

7. A method according to claim 1, wherein the printer maintenance function resource is a file containing image data for incorporation into the HTML-based page.

8. A method according to claim 7, wherein the image data in the file represents the printer maintenance function name corresponding to the printer maintenance function resource.

9. A method according to claim 1, wherein the printer maintenance function command parameter is a printer maintenance function command which is identified by the printer maintenance function name corresponding to the printer maintenance function command parameter.

10. A method according to claim 1, wherein the printer maintenance function command parameter represents a command file containing a printer maintenance function command which is identified by the printer maintenance function name corresponding to the printer maintenance function command parameter.

11. A method according to claim 1, wherein an interface module is a standardized software module for building an HTML-based page.

12. A method according to claim 11, wherein the interface module is provided by the operating system of the server.

13. A method according to claim 1, wherein the interface module is a common gateway interface module.

14. A method according to claim 1, wherein the selection by the network device of one of the printer maintenance function names is performed by a user of the network device.

15. A method according to claim 1, wherein the user of the network device selects one of the printer maintenance function names by using a pointing device connected to the network device.

16. A method according to claim 1, wherein the method is performed in the server.

17. A method according to claim 1, wherein the network environment is a digital cable network.

18. A method according to claim 17, wherein the network device is a set top box.

19. A method according to claim 17, wherein the method is performed in the server which is located in a cable head end of the digital cable network.

20. A method according to claim 1, wherein the server executes a script to send the printer maintenance command to the printer.

21. A method according to claim 20, wherein the script is a common gateway interface script.

22. A network server for supporting printer maintenance in a network environment having at least one network device and a printer, the server containing a plurality of printer configuration files, comprising:

a program memory for storing process steps executable to perform a method according to any one of claims 1 to 6, 7 to 10, 11 to 21; and a processor for executing the process steps stored in said program memory.

23. A program having computer-executable process steps stored on a computer readable medium, said computer-executable process steps to support printer maintenance in a network environment having a server, at least one network device and a printer, the server containing a plurality of printer configuration files, said computer-executable process steps comprising process steps executable to perform a method according to any one of claims 1 to 6, 7 to 10, and 11 to 21.

24. A computer-readable medium which stores computer-executable process steps, the computer-executable process steps to support printer maintenance in a network environment having a server, at least one network device and a printer, the server containing a plurality of printer configuration files, said computer-executable process steps comprising process steps executable to perform a method according to any one of claims 1 to 6, 7 to 10, 11 to 21.

* * * * *